United States Patent
Edge et al.

(10) Patent No.: US 10,499,229 B2
(45) Date of Patent: Dec. 3, 2019

(54) ENHANCED FALLBACK TO IN-BAND MODE FOR EMERGENCY CALLING

(71) Applicant: QUALCOMM Incorporated, San Diego, CA (US)

(72) Inventors: Stephen William Edge, Escondido, CA (US); Nikolai Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/191,923

(22) Filed: Jun. 24, 2016

(65) Prior Publication Data
US 2017/0215056 A1 Jul. 27, 2017

Related U.S. Application Data

(60) Provisional application No. 62/292,761, filed on Feb. 8, 2016, provisional application No. 62/286,432, filed on Jan. 24, 2016.

(51) Int. Cl.
*H04W 4/90* (2018.01)
*H04B 1/00* (2006.01)
(Continued)

(52) U.S. Cl.
CPC .............. *H04W 4/90* (2018.02); *H04B 1/005* (2013.01); *H04J 11/00* (2013.01); *H04L 43/087* (2013.01);
(Continued)

(58) Field of Classification Search
CPC ....... H04W 4/22; H04W 28/14; H04W 4/185; H04W 88/02; H04W 4/20; H04W 52/0225; H04W 52/0229; H04J 11/00; H04B 1/005
See application file for complete search history.

(56) References Cited

U.S. PATENT DOCUMENTS 3,300,740 A * 1/1967 Herzog .................. H02M 1/14
333/181
5,768,308 A * 6/1998 Pon .......................... H04M 3/40
370/287

(Continued)

OTHER PUBLICATIONS

International Search Report and Written Opinion—PCT/US2016/066834—ISA/EPO—dated Mar. 3, 2017.

*Primary Examiner* — Warner Wong
(74) *Attorney, Agent, or Firm* — Kilpatrick Townsend & Stockton, LLP

(57) ABSTRACT

Techniques are disclosed for increasing the reliability of transferring data via in-band signaling in a audio channel of a communication network. Techniques include causing an audio decoding process to modify the decoding of audio signals for the audio channel based on obtaining an indication of in-band signaling. The modified decoding may replace an adaptive de-jitter buffer by a static de-jitter buffer or increase the buffering time of an adaptive de jitter buffer. The decoded audio signals may be provided to an in-band message detector, an audio encoder or an audio playback device based on the indication of in-band signaling. The techniques may be employed by a user equipment, a media gateway control function or a media gateway to improve the reliability of in-band transfer of a minimum set of data (MSD) for a Next Generation eCall.

28 Claims, 9 Drawing Sheets

(51) Int. Cl.
*H04J 11/00* (2006.01)
*H04L 12/26* (2006.01)
*H04W 4/18* (2009.01)
*H04W 28/14* (2009.01)
*H04W 52/02* (2009.01)
*H04L 27/00* (2006.01)
*H04W 88/02* (2009.01)
*H04W 88/16* (2009.01)

(52) U.S. Cl.
CPC ............ *H04W 4/185* (2013.01); *H04W 28/14* (2013.01); *H04L 2027/0089* (2013.01); *H04W 52/0225* (2013.01); *H04W 88/02* (2013.01); *H04W 88/16* (2013.01)

(56) References Cited

U.S. PATENT DOCUMENTS

| | | | |
|---|---|---|---|
| 6,600,740 | B1 | 7/2003 | Valentine et al. |
| 6,987,974 | B1* | 1/2006 | Mostafa ............. H04Q 11/0457 370/351 |
| 8,200,185 | B2* | 6/2012 | Edge ................... H04W 76/007 455/404.1 |
| 8,265,696 | B1* | 9/2012 | Verkama ............. H04W 88/181 370/357 |
| 9,275,650 | B2* | 3/2016 | Ishikawa ............. G10L 19/0212 |
| 9,768,853 | B1* | 9/2017 | Kroeger ................ H04H 20/30 |
| 2002/0093924 | A1* | 7/2002 | Preston ................ G01S 5/0027 370/328 |
| 2002/0176601 | A1* | 11/2002 | Rhoads ............... G06F 12/1408 382/100 |
| 2004/0125764 | A1* | 7/2004 | Piwowarski ........... H04W 4/90 370/328 |
| 2007/0280277 | A1* | 12/2007 | Lund ..................... H04L 49/205 370/412 |
| 2008/0069002 | A1* | 3/2008 | Savoor ............. H04L 29/06027 370/241 |
| 2009/0306975 | A1* | 12/2009 | Pietsch .................. H04J 3/0611 704/214 |
| 2009/0311988 | A1* | 12/2009 | Johannesson ........... H04W 4/14 455/404.2 |
| 2010/0202368 | A1* | 8/2010 | Hans ..................... H04M 3/5116 370/329 |
| 2010/0227584 | A1* | 9/2010 | Hong .................... H04M 11/04 455/404.1 |
| 2011/0060594 | A1* | 3/2011 | Trainor ................... G10L 19/22 704/500 |
| 2011/0287736 | A1 | 11/2011 | Hirano |
| 2011/0294501 | A1* | 12/2011 | Wang .................. H04L 65/1043 455/426.1 |
| 2012/0225632 | A1* | 9/2012 | Hellwig .................. H04W 4/22 455/404.1 |
| 2013/0035105 | A1* | 2/2013 | Yu ......................... H04W 76/02 455/450 |
| 2013/0078943 | A1* | 3/2013 | Biage .................. H04M 3/5116 455/404.2 |
| 2013/0159005 | A1* | 6/2013 | Kikuiri ................... G10L 19/00 704/500 |
| 2014/0134968 | A1 | 5/2014 | Raouf et al. |
| 2015/0085997 | A1* | 3/2015 | Biage .................. H04M 3/5116 379/45 |
| 2015/0111517 | A1* | 4/2015 | Kowalewski ....... H04L 65/1069 455/404.1 |
| 2015/0264548 | A1 | 9/2015 | Lee |
| 2016/0029197 | A1* | 1/2016 | Gellens ................. H04W 4/90 455/404.1 |
| 2016/0105784 | A1* | 4/2016 | Gellens ............... H04M 3/5116 455/404.1 |
| 2017/0223515 | A1* | 8/2017 | Mutikainen ........... H04W 4/90 |
| 2017/0295482 | A1 | 10/2017 | Khan |
| 2018/0268681 | A1* | 9/2018 | Schinkel ............. H04M 3/5116 |

\* cited by examiner

ENHANCED FALLBACK TO IN-BAND MODE FOR EMERGENCY CALLING

CROSS-REFERENCES TO RELATED APPLICATIONS

This application claims the benefit of:

(1) U.S. Provisional Patent Application Ser. No. 62/286,432, entitled "ENHANCED FALLBACK TO INBAND MODE FOR EMERGENCY CALLING," filed on Jan. 24, 2016, and (2) U.S. Provisional Patent Application Ser. No. 62/292,761, entitled "ENHANCED FALLBACK TO INBAND MODE FOR EMERGENCY CALLING," filed on Feb. 8, 2016, both of which are assigned to the assignee hereof and incorporated herein by reference for all purposes.

BACKGROUND

The following relates generally to wireless communication, and more specifically to the wireless transmission and receipt of telematics data and metadata. In some systems, telematics data (e.g., sensor readings and other data) may be transmitted from an intelligent terminal to a central service for processing. For example, a terminal associated with a vehicle experiencing a collision may transmit measured location data and pre-configured vehicle data over a wireless communication system to a public safety answering point (PSAP) in connection with a request for emergency services. In some systems, the data may be transmitted to a third-party service provider (TSP), which may then convey some or all of the data to a PSAP.

SUMMARY

Techniques are disclosed for increasing the reliability of data received (e.g., by a PSAP from a user equipment (UE)) via in-band signaling in a voice channel of a communication network. Techniques include causing a decoding (e.g. a transcoding) module to alter the manner in which it decodes (e.g. transcodes) input signals based on obtaining an indication of in-band signaling, and causing the in-band signaling to be provided to the decoding (e.g. transcoding) module for decoding (e.g. transcoding). In some embodiments, the decoding (e.g. transcoding) module alters its manner of decoding (e.g. transcoding) by disabling or modifying the use of an adaptive de-jitter buffer.

An example method of increasing the reliability of the transfer of data received via in-band signaling, according to the disclosure, comprises obtaining an indication of in-band signaling, the in-band signaling occurring in an audio channel of a communication network, and in response to obtaining the indication of in-band signaling, utilizing a modified decoding process to decode audio signals for the audio channel.

An example device for increasing reliability of the transfer of data received via in-band signaling, according to the disclosure, comprises a communications subsystem, and a processing unit communicatively coupled to the communications subsystem and configured to cause the apparatus to obtain an indication of in-band signaling, the in-band signaling occurring in an audio channel of a communication network, and in response to obtaining the indication of in-band signaling, utilize a modified decoding process to decode audio signals for the audio channel.

An example apparatus for increasing reliability of the transfer of data received via in-band signaling, according to the disclosure, comprises means for obtaining an indication of in-band signaling, the in-band signaling occurring in an audio channel of a communication network, and means for, in response to obtaining the indication of in-band signaling, utilizing a modified decoding process to decode audio signals for the audio channel.

An example non-transitory computer readable medium, according to the disclosure, has instructions embedded thereon for increasing reliability of the transfer of data received via in-band signaling. The instructions include computer code for obtaining an indication of in-band signaling, the in-band signaling occurring in an audio channel of a communication network, and in response to obtaining the indication of in-band signaling, utilizing a modified decoding process to decode audio signals for the audio channel.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

BRIEF DESCRIPTION OF THE DRAWINGS

An understanding of the nature and advantages of various embodiments may be realized by reference to the following figures.

DETAILED DESCRIPTION

Figure 1:
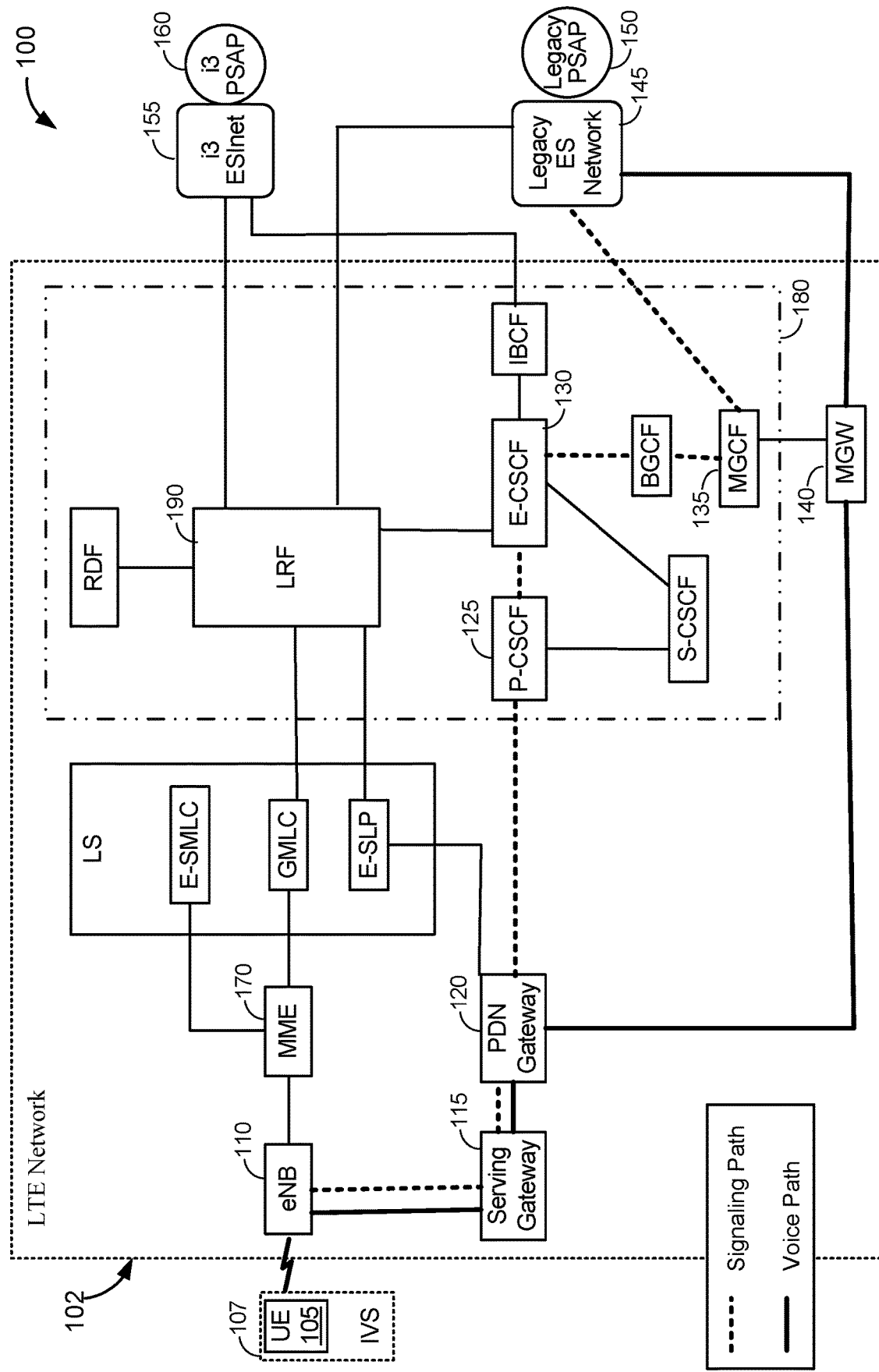
FIG. 1 is a simplified block diagram illustrating the architecture of a system for enabling NG eCalls for LTE, according to an embodiment.

Terminals associated with vehicles offering manual and automatic emergency calling functionality typically establish a voice channel (also referred to as a voice media path or audio channel) between a vehicle occupant and a PSAP operator and use the voice channel to transfer telematics data in-band to the PSAP operator. Telematics data may also be transmitted from the terminal to a central service (e.g., a TSP server) in-band using a voice channel. Metadata associated with the telematics data, such as an acknowledgement that the telematics data was satisfactorily (e.g., successfully) received or a request for updated telematics data, may also be communicated in-band over the voice channel from a central service or PSAP to the terminal.

In a wireless communication system that provides IP based wireless access, such as the 3GPP LTE system, it may be more efficient and less obstructive to vehicle occupants and the service center (e.g. a TSP or PSAP) to transfer the telematics data and metadata using out-of-band signaling means such as using SIP signaling, IMS and/or a separate dedicated data channel rather than transferring the data in-band over the voice channel. However, in some scenarios, a service center (e.g. a PSAP or TSP server) may not support out-of-band signaling—for example, if the service center is connected to the Public Switched Telephone Network or to a Circuit Switched (CS) selective router rather than to the Internet or to an IP router. In that case, the telematics data and metadata may need to be transferred in-band over the voice channel—e.g. by modulating the voice channel using in-band signaling, Baudot tones, or some other in-band modem technique.

The transmission of telematics data and metadata over a voice channel by in-band means can be problematic in that voice communication may be blocked or experience interference during the transmission of telematics data and metadata. Moreover, the transmission of modulated digital data through voice channels may provide limited data throughput or be unreliable due to voice processing functions in the network (e.g., improperly tuned echo-cancellers and use of compression on network trunks). These limitations may be particularly acute in systems such as Long Term Evolution (LTE) and High Speed Packet Access (HSPA) when a voice channel is provided through packet rather than circuit means because of the use of additional vocoding and transcoding including use of de-jitter buffering which may further distort in-band audio signaling leading to even less reliable transfer of telematics data and metadata and more interference to voice communication.

This disclosure is generally related toward techniques for increasing the reliability and speed of the transfer of data, such as telematics data and metadata, received via in-band signaling. The disclosure uses a number of abbreviations to describe various specific embodiments, although it will be understood that embodiments are not so limited. Table 1 provides a list of abbreviations used in this disclosure.

TABLE 1

| Abbreviations | |
|---|---|
| 3GPP | 3rd Generation Partnership Project |
| AP | Access Point |
| BGCF | Breakout Gateway Control Function |
| CS | Circuit Switched |
| DJB | De-Jitter Buffer |
| DTMF | Dual Tone Multi Frequency |
| E-CSCF | Emergency Call Session Control Function |
| eNB | Evolved Node B (eNodeB) |
| EPS | Evolved Packet System |
| ES | Emergency Services |
| ESInet | Emergency Services IP network |
| E-SLP | Emergency Services SLP |
| E-SMLC | Enhanced Serving Mobile Location Center |
| GMLC | Gateway Mobile Location Center |
| GNSS | Global Navigation Satellite System |
| GSM | Global System for Mobile Communications |
| HL-ACK | High-Level Acknowledgement |
| HPLMN | Home Public Land Mobile Network |
| IAM | Initial Address Message |
| IBCF | Interconnection Border Control Function |

TABLE 1-continued

| Abbreviations | |
|---|---|
| IMS | IP Multimedia Subsystem |
| IP | Internet Protocol |
| ISDN | Integrated Services Digital Network |
| ISUP | ISDN User Part |
| IVS | In-Vehicle System |
| LRF | Location Retrieval Function |
| LS | Location Service |
| LTE | Long Term Evolution |
| MF | Multifrequency |
| MGCF | Media Gateway Control Function |
| MGW | Media Gateway |
| MME | Mobility Management Entity |
| MSD | Minimum Set of Data |
| NG eCall | Next Generation eCall |
| OFDM | Orthogonal Frequency Division Multiplexing |
| PCM | Pulse Code Modulation |
| P-CSCF | Proxy Call Session Control Function |
| PDN | Packet Data Network |
| PS | Packet Switched |
| PSAP | Public Safety Answering Point |
| PSTN | Public Switched Telephone Network |
| S-CSCF | Serving Call Session Control Function |
| SIP | Session Initiation Protocol |
| SLP | SUPL Location Platform |
| SPS | Satellite Positioning System |
| SS7 | Signaling System Number 7 |
| SUPL | Secure User Plane Location |
| TS | Technical Specification |
| UE | User Equipment |
| UMTS | Universal Mobile Telecommunications System |
| VoIP | Voice over IP |
| VoLTE | Voice over LTE |
| WLAN | Wireless Local Area Network |

An automatic or manually triggered emergency related call from a terminal associated with a vehicle to a PSAP or TSP is sometimes referred to as an eCall. This applies in Europe where the term "eCall" denotes a particular kind of emergency call from an In Vehicle System (IVS) to a PSAP over a wireless communication network such as a GSM, UMTS or LTE network. An eCall may be instigated from an IVS in a vehicle either automatically when sensors detect an emergency situation (e.g. deployment of airbags) or manually by invocation by the driver or a passenger in the vehicle. As part of the eCall, telematics data, referred to as a minimum set of data (MSD), is transferred from the User Equipment (UE) component of the IVS to the PSAP either during eCall establishment or immediately (e.g. a few seconds) after eCall establishment. The MSD can include information helpful or critical to the PSAP (which may not otherwise be obtainable, in the case where a driver or passenger in a vehicle is unconscious or otherwise unable to provide information vocally), including, for example: location of the vehicle, vehicle identification information, type of vehicle, possible hazardous cargo in the vehicle, number of seatbelts being used (and/or other information that may be indicative of the number of passengers in the vehicle), sensor information, and the like. Following successful transfer of the MSD, the PSAP may return metadata to the IVS confirming the successful transfer. At some later point in the call, the PSAP may send metadata to the IVS to request the IVS to send an updated MSD to the PSAP (e.g. containing a new location for the vehicle and/or an indication of a different number of vehicle occupants). The MSD and associated metadata (e.g. MSD confirmation or MSD request) may be transferred using in-band or out-of-band means that may depend on whether the wireless communication system that is being used supports or does not support out-of-band transfer.

With Next Generation (NG) eCall (also referred to as eCall over IMS), transfer of the MSD typically occurs using out-of-band means and may be applicable when the wireless communication system uses LTE. Out-of-band transfer may typically be both faster and more reliable than transferring the MSD by in-band means using the voice media path from the IVS to the PSAP, which may need to be supported for eCall over older technologies such as GSM or UMTS. However, out-of-band transfer of MSD (e.g. using SIP or using a separate dedicated data channel) may depend on a PSAP being IP (e.g. SIP) capable.

When NG eCall is initially released in Europe, which could occur as early as 2018 to fulfill a mandate from the European Parliament, many PSAPs may still be "legacy," only capable of accepting circuit-switched calls (e.g., via ISDN or DTMF interface). Thus, to ensure backward compatibility of NG eCall with legacy systems, IP based signaling, such as SIP signaling, may need to be converted to be communicated within a circuit-switched network. For example, in these cases, an originating IMS network may use a Media Gateway Control Function (MGCF) to convert SIP signaling on the originating network side to SS7 ISDN User Part (ISUP) or multifrequency (MF) signaling on the PSAP (or Public Switched Telephone Network (PSTN)) side and an associated Media Gateway (MGW) may be used to convert VoIP on the network side to circuit-based voice (e.g. PCM A law) on the PSAP (or PSTN) side.

When this conversion of SIP signaling takes place (e.g., when an eCall is sent to a legacy PSAP), the MSD may not be transferred by the MGCF if included in SIP signaling (e.g. in a SIP INVITE message) and may instead be discarded by the MGCF. There may be a similar occurrence when the MSD is transferred using other out-of-band means—e.g. if the MSD is to be transferred using a separate dedicated data channel, the MGCF may indicate to the IVS that the separate data channel cannot be established. When the UE element in the IVS does not then receive metadata from the PSAP confirming receipt of the MSD by the PSAP (or when the UE is informed by other means that out-of-band transfer of the MSD is not possible), the UE may send the MSD in-band (e.g., via a data modem) as part of the voice media path. The PSAP, if eCall capable, may then be able to receive and acknowledge the MSD by in-band means.

With GSM and UMTS, in-band transfer of the MSD used for eCall has been shown to be highly reliable and to interrupt the voice path for only around 5 to 10 seconds. However, with LTE access, as may be used for NG eCall, the transfer is known to be much less reliable and to typically interrupt the voice path for longer. This is due to using a data modem to encode the MSD data as in-band audio that is sensitive to voice packetization and depacketization (e.g. use of adaptive De-Jitter Buffers (DJBs) at a receiver) and the particular codecs used for LTE. The result is that NG eCall may transfer the MSD less reliably and cause more interruption of voice communication than the in-band eCall system for GSM and UMTS that is replaced by NG eCall in the case of LTE. This problem may arise whenever an IVS has access to an LTE network but not to a GSM or UMTS network and the PSAP to which the eCall is routed is only capable of supporting eCall where the MSD is transferred in-band over the voice channel. In this scenario, the IVS may need to instigate an IP based emergency call as for NG eCall but transfer the MSD by in-band means over the voice media path, thereby risking reduced reliability, slower transfer of the MSD and a longer period of interference (e.g. blockage) of the voice media path for voice communication between the PSAP and occupant(s) of the vehicle.

This disclosure provides techniques for increasing the reliability of NG eCall for LTE in the case where telematics data in the form of MSD needs to be transferred in-band from the UE component of an IVS to a PSAP or TSP and/or where metadata in the form of an MSD confirmation of receipt or request for updated MSD needs to be transferred in-band from a PSAP or TSP to an IVS. However, embodiments are not be so limited and may be used to assist other applications where data cannot be transferred by out-of-band means and needs instead to be transferred by in-band means over a media path such as a voice media path. For example, the techniques herein may be utilized to transfer telematics data that may differ from the MSD currently defined for Europe, and/or to transfer metadata that may differ from metadata currently defined for the MSD in Europe, from an IVS to either a PSAP or a TSP and/or from a PSAP or TSP to an IVS. In addition, the techniques may be used to support other types of NG communication between a UE and a service provider where some information is transferred between the UE and the service provider by out-of-band means (e.g. using a separate data channel or using SIP signaling messages) and where the information needs to be transferred in-band over a voice or other media path (e.g. video path) between the UE and the service provider when the service provider is not IP capable or can only be accessed from the UE by CS means.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

It is noted that the terms 'eCall' and "NG eCall" as used herein may be synonymous in certain contexts such as when an NG eCall is routed to a legacy PSAP over the CS domain. The resulting eCall (or NG eCall) may then have characteristics of both an eCall and an NG eCall. For example, the UE component of the IVS that originates the NG eCall may continue to use SIP and IP based signaling to establish and later release the eCall (or NG eCall) but may transfer any telematics data (e.g. MSD) by in-band means, the same as for a normal (non-NG) eCall. In addition, an intermediate entity (e.g. an MGCF) may convert the SIP and IP based signaled used by the UE into CS based signaling (e.g. SS7 ISUP) used by a CS based network accessed by the legacy PSAP. Thus, in the description herein, the terms "eCall" and "NG eCall" are used interchangeably for scenarios where a UE component of an IVS originates an NG eCall which is routed to a legacy PSAP—such as described later herein for FIG. 2 for an eCall from UE 105 to a legacy PSAP 150.

FIG. 1 is a simplified block diagram illustrating the architecture of a system 100 for enabling NG eCall for LTE, according to an embodiment. Among other components, the system includes a UE 105, which may be incorporated into and/or otherwise connected with an In-Vehicle System (IVS) 107, an LTE network (also referred to as an Evolved Packet System (EPS)) 102, a Legacy Emergency Services (ES) Network 145 with a Legacy PSAP 150, and a National Emergency Number Association (NENA) i3 Emergency Services IP network (ESInet) 155 with a NENA i3 capable PSAP 160. The LTE network 102 may include an Evolved Node B (eNodeB, or eNB) 110, a Serving Gateway 115, a Packet Data Network (PDN) Gateway 120, a Mobility Management Entity (MME) 170, a Proxy Call Session Control Function (P-CSCF) 125, an Emergency Call Session Control Function (E-CSCF) 130, a Media Gateway Control Function (MGCF) 135, and a Media Gateway (MGW) 140. In some embodiments, the MGCF 135 may be incorporated into or otherwise joined with the MGW 140. In other embodiments, such as the embodiment shown in FIG. 1, they may be separately implemented and/or maintained. As shown, the system 100 may comprise other components (some of which are shown in FIG. 1 but which are not discussed in this disclosure), and other embodiments may add, omit, join, separate, rearrange, or otherwise alter components depending on desired functionality. Such variations will be recognized by a person of ordinary skill in the art.

The IVS 107 may be part of a vehicle (e.g. a car or truck) and may support telematics services for NG eCall as previously described. The IVS 107 may include a UE 105 as an embedded component or may be connected to (e.g. coupled to) the UE 105 (e.g. via Bluetooth®). The UE 105 may support the signaling and voice transfer functions for NG eCall and may be similar to or the same as other wireless terminals (e.g. a cellular phone or smartphone) in terms of wireless communications capability. The IVS 107 may include other components (not shown in FIG. 1) such as sensors which may detect different types of emergency situations for the associated vehicle, for which an NG eCall may be needed, such as violent acceleration or deceleration, deployment of airbags or a fire. The eNB 110 may be a serving eNB for the UE 105 and may provide wireless communications access to the LTE network 102 on behalf of UE 105. The MME 170 may be a serving MME for the UE 105 and may support mobility of UE 105 and provision of signaling access and voice bearer paths. The serving gateway 115 and PDN gateway 120 may provide IP based signaling and IP transport support for UE 105—e.g. with PDN gateway 120 assigning an IP address for UE 105 and providing IP access to other entities in LTE network 102 such MGW 140 and P-CSCF 125.

LTE network 102 may include an IP Multimedia Subsystem (IMS) 180 that may include the P-CSCF 125, E-CSCF 130, MGCF 135 and LRF 190. IMS 180 may support an NG eCall from UE 105 to a PSAP such as i3 PSAP 160 or legacy PSAP 150. For example, in the case of an NG eCall from UE 105 to i3 PSAP 160, a signaling path from UE 105 (not shown in FIG. 1) may pass through the eNB 110, serving gateway 115, PDN gateway 120, P-CSCF 125, E-CSCF 130, an IBCF, the i3 ESInet 155 and i3 PSAP 160. In the case of an NG eCall from UE 105 to legacy PSAP 150, a signaling path from UE 105 (shown in FIG. 1 by the dashed bolded line) may pass through the eNB 110, serving gateway 115, PDN gateway 120, P-CSCF 125, E-CSCF 130, a BGCF, MGCF 135, the legacy ES Network 145 and legacy PSAP 150. Elements in IMS 180 may provide call handling and call routing support to enable an NG eCall from UE 105 to either i3 PSAP 160 or legacy PSAP 150. For example, P-CSCF 125 may detect an NG eCall when instigated by UE 105 (e.g. by receiving, decoding and interpreting a SIP INVITE message sent by UE 105). E-CSCF 130 may support routing of an NG eCall from UE 105 (e.g. by sending a SIP INVITE from UE 105 received via P-CSCF 125 towards either legacy PSAP 150 via MGCF 135 or i3 PSAP 160 via an IBCF). LRF 190 may assist routing of an NG eCall from UE 105 when queried by E-CSCF 130. For example, LRF 190 may determine a location for UE 105 (e.g. from information provided by UE 105 in a SIP INVITE) and may determine a PSAP (e.g. legacy PSAP 150 or i3 PSAP 160) that supports an NG eCall for that location and may return an identity or address for this PSAP to E-CSCF 130. MGCF 135 may perform conversion of SIP based signaling, received from or sent to UE 105, to or from signaling used by ES network 145 such as ISUP signaling in the case of an NG eCall to legacy PSAP 150. For example, MGCF 135 may partly convert an NG eCall received from UE 105 into a Circuit Switched (CS) eCall in the case of an NG eCall routed to legacy PSAP 150.

I3 ESInet 155 may support IP based emergency calls including an NG eCall from UE 105 on behalf of i3 PSAP 160—e.g. may route an NG eCall from UE 105 to i3 PSAP 160. Legacy ES network 145 may similarly support Circuit Switched (CS) based emergency calls on behalf of legacy PSAP 150 including a CS eCall (also referred to as just an eCall) received via MGCF 135 from UE 105—e.g. may route a CS eCall from UE 105 received via MGCF 135 to legacy PSAP 150. MGW 140 may convert between VoIP received from or sent to UE 105 and CS based voice sent to or received from legacy PSAP 150 in the case of an NG eCall from UE 105 to legacy PSAP 150.

In the case of an NG eCall from UE 105 to legacy PSAP 150, the signaling path from the UE 105 to the legacy PSAP 150, marked with a dashed bolded line, communicatively connects the UE 105 with the Legacy PSAP 150 and is used to transfer signaling messages (e.g. SIP messages, ISUP messages) and/or other signals (e.g. MF tones). As previously described, this path includes the following chain of elements: UE 105, eNB 110, Serving Gateway 115, PDN Gateway 120, P-CSCF 125, E-CSCF 130, MGCF 135, Legacy ES Network 145, and Legacy PSAP 150. The voice path (also referred to as a voice media path, media path, data path, voice channel, audio channel, audio path) for an NG eCall from the UE 105 to the legacy PSAP 150, marked with a solid bolded line, communicatively connects the UE with the legacy PSAP 150. This path includes the following chain of components: UE 105, eNB 110, Serving Gateway 115, PDN Gateway 120, MGW 140, legacy ES Network 145, and legacy PSAP 150. Communication of signaling (e.g. SIP messages) from the UE 105 to the MGCF 135 is typically packet switched (PS) (e.g., SIP transported using TCP or UDP over IP), while communication of signaling from the MGCF 135 to the legacy PSAP 150 may be based on SS7 (e.g. ISUP) and/or may use in-band MF signaling, although embodiments may vary. Communication of voice from the UE 105 to the MGW 140 is typically packet switched (PS) (e.g., VoLTE, VoIP), while communication of voice from the MGW 140 to the legacy PSAP 150 is circuit switched (CS) (e.g. PCM A-law, PCM pt-law), although embodiments may vary.

In keeping with normal terminology for wireless communication, audio, voice, data, signaling and/or other communication that is sent from UE 105 to or towards legacy PSAP 150 or i3 PSAP 160 or to or towards any element in the LTE network 102 is referred as being transferred, sent or received "uplink" or in an "uplink direction". Similarly, audio, voice, data, signaling and/or other communication that is sent from legacy PSAP 150, i3 PSAP 160 or any element in LTE network 102 to or towards UE 105 is referred as being transferred, sent or received "downlink" or in a "downlink direction".

Figure 2:
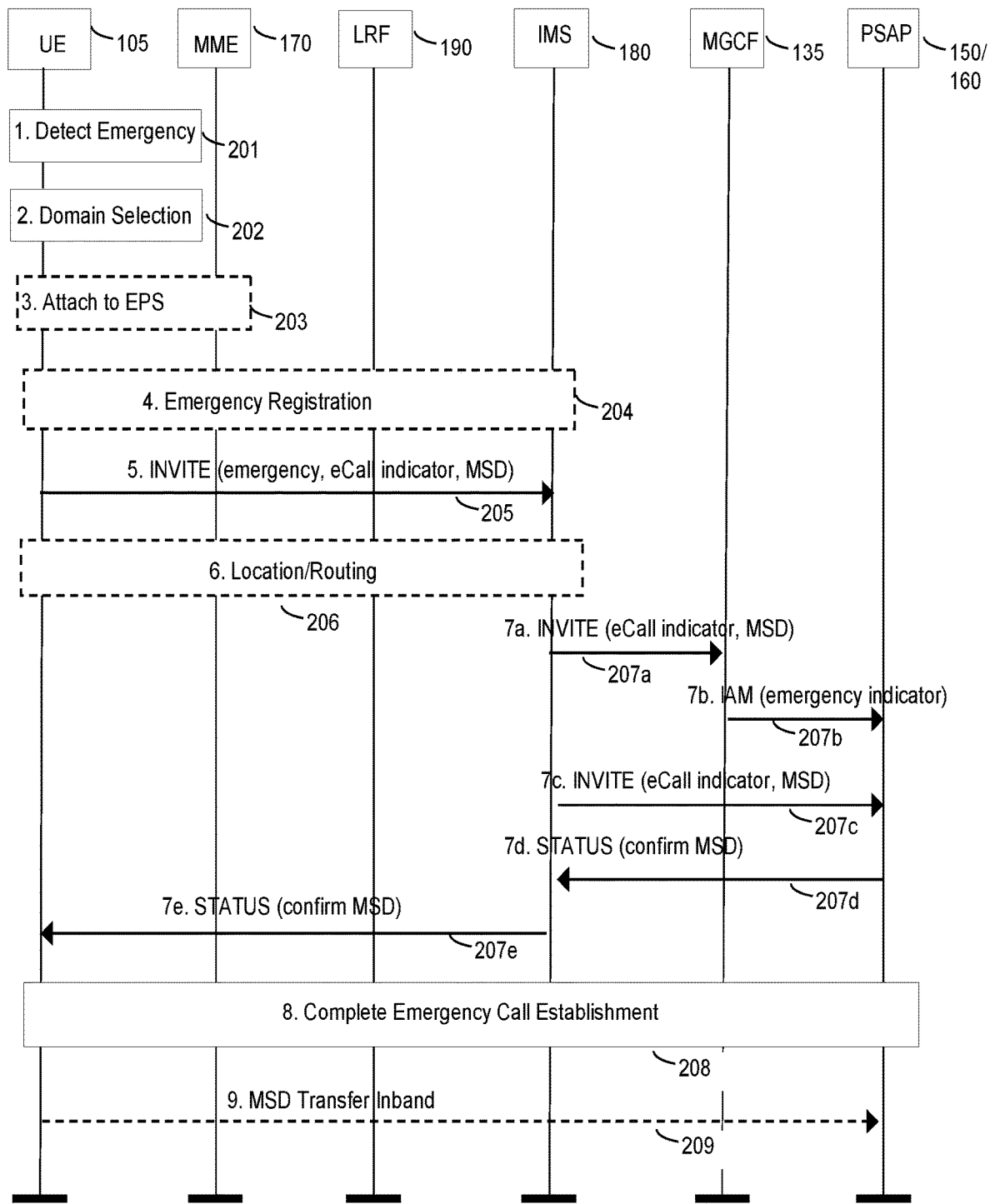
FIG. 2 is a signaling flow illustrating how, according to an embodiment, various components of an LTE system can interact to establish an NG eCall, resulting in an in-band MSD transfer.

FIG. 2 is a signaling flow illustrating how various components of the system 100 of FIG. 1 can establish an NG eCall, resulting in an in-band MSD transfer, as discussed previously. Here, some principal elements but not all elements of the LTE network 102 are shown. Some actions attributed to or implied for certain elements or certain groups of elements of the LTE network 102 shown in FIG. 2 may therefore be supported in part by other elements not shown in FIG. 2. For example, references to actions performed by or involving MME 170 can be assisted or provided by the eNB 110, Serving Gateway 115, PDN Gateway 120, and/or other components of FIG. 1, and the IMS 180 can refer to the P-CSCF 125 and/or the E-CSCF 130 of FIG. 1, or may correspond to all the elements of the IMS 180. As mentioned previously, techniques disclosed herein are not necessarily limited to the architecture illustrated in FIG. 1.

As shown in FIG. 2, establishing an NG eCall from UE 105 to legacy PSAP 150 can be performed in nine phases each comprising one or more stages, as follows.

Phase 1: the IVS 107 (not shown in FIG. 2) detects an emergency situation either via manual user input (e.g., a driver or passenger of a vehicle presses an emergency help button) or automatically using sensors (e.g., sensing an abrupt acceleration/deceleration, air-bag deployment, fire, water, etc.) and informs the UE 105 at stage 201.

Phase 2: the UE 105 performs domain selection at stage 202 to select either the CS or PS domain and find an accessible wireless network supporting this domain. If the CS domain is selected (not shown in FIG. 2), a CS eCall is instigated. If the PS domain is selected, LTE network 102 is accessed in this example and the rest of the actions in FIG. 2 are performed.

Phase 3: UE 105 attaches to LTE network 102 at stage 203 if not already attached (e.g. if the UE 105 is configured for eCall only mode and only attaches to a wireless network to instigate an eCall, test call, or call to a home network operator). The attachment at stage 203 is supported by MME 170 and by other elements not shown in FIG. 2 such as eNB 110 and PDN gateway 120. During the attachment at stage 203, UE 105 obtains an emergency bearer and discovers a P-CSCF 125 suitable for emergency services. The UE 105 may release resources (e.g. bearer resources) for any previous ongoing sessions if needed to perform this phase.

Phase 4: the UE 105 performs an emergency IMS registration at stage 204 with the IMS 180. The emergency IMS registration at stage 204 may also be performed with the IMS in a home network for the UE 105 (not shown in FIG. 2) if the UE 105 is roaming (e.g. if LTE network 102 is not the home network for UE 105).

Phase 5: the UE 105 sends a SIP INVITE message to the IMS 180 (e.g. to the P-CSCF 125) at stage 205. The INVITE sent at stage 205 may contain an eCall indication, which may indicate an emergency call and whether the eCall was manually or automatically invoked, and telematics data which in this example comprises MSD. In an alternative embodiment, the MSD may not be included in the SIP INVITE sent at stage 205 and UE 105 may instead attempt to send the telematics data (e.g. after the NG eCall is established) using alternative techniques, such as by using a separate data channel which may be established in parallel with or after establishment of the voice path during phase 8.

Phase 6: At stage 206, the IMS 180 (e.g. the E-CSCF 130) may query the LRF 190 to obtain call routing and/or location information for the UE 105 and the LRF 190 may obtain the location of the UE (e.g. via an interaction involving the MME 170 and/or UE 105) in order to provide call routing and/or location information.

Phase 7: The IMS 180 (e.g. the E-CSCF 130) uses any routing information obtained in phase 6 (e.g. provided by LRF 190) or selects an emergency center or PSAP based on information provided in phase 5 and sends the NG eCall request (e.g. SIP INVITE message) including the eCall indication, MSD and any location information obtained in phase 5 or phase 6 to or towards the emergency center or PSAP. If the emergency center or PSAP is accessed over the CS domain (i.e., the PSAP is a legacy PSAP 150), actions 7a and 7b are performed. For action 7a: the SIP INVITE is sent to MGCF 135 at stage 207a. For action 7b: the MGCF 135 sends an ISUP Initial Address Message (IAM) towards the legacy PSAP 150 (e.g. sends the IAM to the legacy ES network 145) at stage 207b. The IAM may carry an emergency indication (e.g. in a Calling Party's Category parameter) and an eCall indication. In some implementations, the indication of an eCall or an indication of call routing to a PSAP that supports eCall may be carried as part of a Called Party Number parameter (e.g. by including certain digits in the Called Party Number parameter) and may not be carried as a separate indication in the IAM. The MSD may be discarded by the MGCF 135 as part of stage 207b. If the emergency center or PSAP is accessed over the PS domain (i.e., the PSAP is i3 PSAP 160), actions 7c, 7d and 7e are performed. For action 7c: the IMS 180 (e.g. the E-CSCF 130) sends the SIP INVITE to or towards the i3 PSAP 160 at stage 207c (e.g. via an IBCF and the i3 ESInet 155) carrying the eCall indication and the MSD. For action 7d, the i3 PSAP 160 returns a SIP STATUS message at stage 207d (e.g. a SIP 200 OK message) to the IMS 180 (e.g. to the E-CSCF 130 via an IBCF and the i3 ESInet 155). The SIP STATUS message carries a confirmation of MSD receipt and possibly an agreement to establish the NG eCall. For action 7e: the IMS 180 (e.g. the E-CSCF 130 and P-CSCF 125) send the STATUS message to the UE 105 at stage 207e, confirming receipt of the MSD. When the eCall is sent to the legacy PSAP 150 over the CS domain as in stages 701a and 702b, a similar STATUS message, such as an ISUP Answer (ANM) message, may be sent by the legacy PSAP 150 after performing actions 7a and 7b as part of phase 8. However, this STATUS message (e.g. ANM message) would not indicate confirmation of the transfer of the MSD because the MSD is not sent to the legacy PSAP 150 by actions 7a and 7b.

Phase 8: the emergency call establishment is completed at stage 208. This includes establishing a voice path (also referred to as a voice channel or audio channel) between the UE 105 and the PSAP (either legacy PSAP 150 or i3 PSAP 160). In the case of an NG eCall to i3 PSAP 160, the voice path may employ VoIP and not need any conversion between different voice encodings. In the case of an NG eCall to legacy PSAP 150, the voice path may go through MGW 140 associated with the MGCF 135 and may also go through other entities as described for FIG. 1 and may undergo one or more transformations such as conversion between VoIP encoding and CS voice encoding at MGW 140.

Phase 9: if the UE 105 does not receive the STATUS message for stage 207e (e.g. the NG eCall is sent to legacy PSAP 150 via the CS domain in stages 207a and 207b) or if the STATUS message received at stage 207e does not contain a confirmation of successful MSD receipt by the PSAP (e.g. by legacy PSAP 150), then at stage 209, the UE 105 attempts to transfer the MSD to the emergency center or PSAP via in-band means over the voice path established in phase 8, as mentioned previously. For example, in the case of an eCall to the legacy PSAP 150, the UE 105 may send the MSD over the voice path to the legacy PSAP 150 without waiting for a request from the legacy PSAP 150 or may wait for an in-band request from the legacy PSAP 150 (sent over the voice path to the UE 105) before sending the MSD to the legacy PSAP 150 over the voice path.

Figure 3:
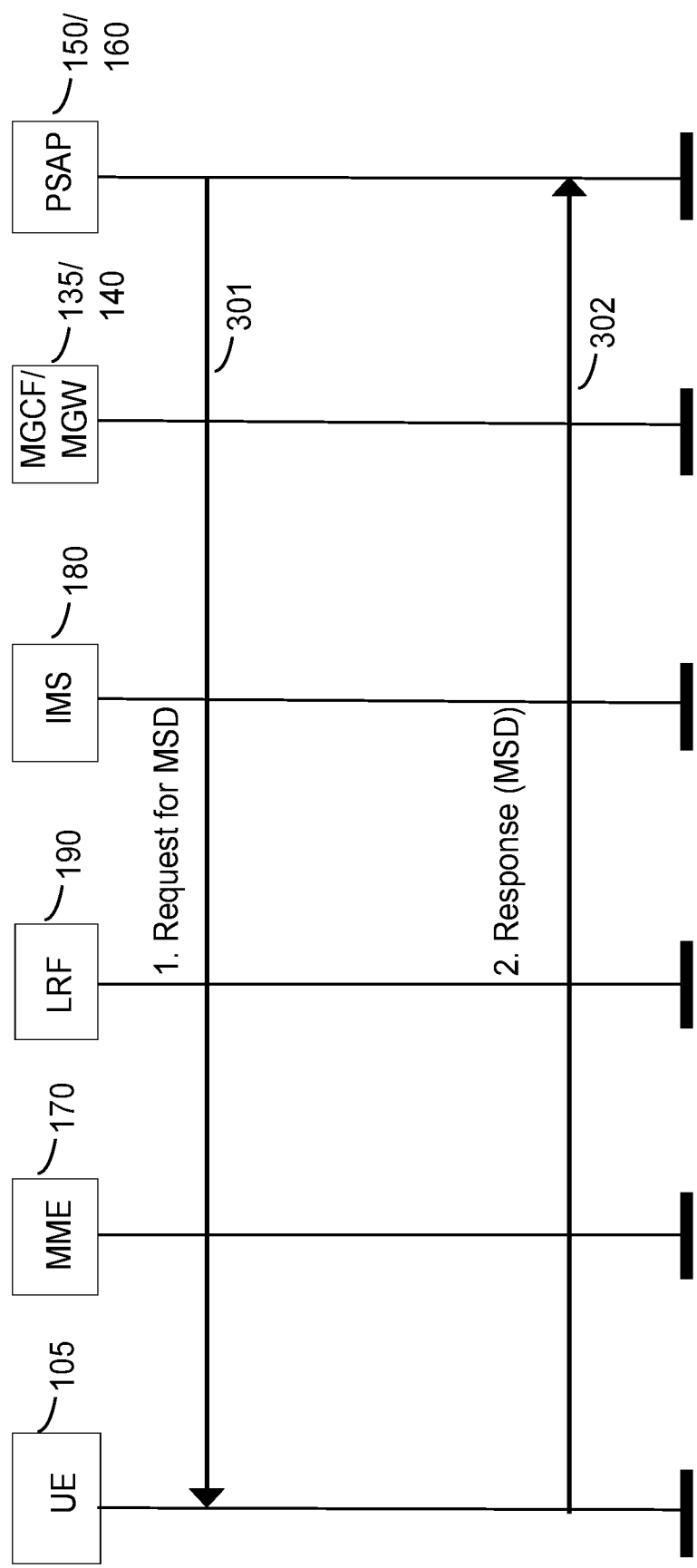
FIG. 3 is a signaling flow illustrating the call flow between components of an LTE system for transferring the MSD, according to one embodiment.

FIG. 3 is a signaling flow illustrating the transfer of an updated MSD from the UE 105 to the legacy PSAP 150 or i3 PSAP 160—e.g. following establishment of an NG eCall according to the example in FIG. 2. The actions illustrated in FIG. 3 can represent an example method of transferring MSD in-band to legacy PSAP 150 accessed via the CS domain (e.g., implementing phase 9 in FIG. 2 and where actions 7a and 7b are performed in FIG. 2). In some alternative embodiments, the actions in FIG. 3 may alternatively or additionally represent a way in which updated MSD is sent to i3 PSAP 160 accessed via the PS domain— e.g. in the case that the MSD has to be sent in-band to the i3 PSAP 160 due to failure of, or lack of support for, out-of-band transfer of the MSD. Here, at action 1 and at stage 301, the legacy PSAP 150 may send a request for MSD to the UE 105 using in-band means over a voice path between the UE 105 and the legacy PSAP 150. The UE 105 responds by, at action 2 and at stage 302, sending the MSD to the legacy PSAP 150 using in-band means over the voice path. For both action 1 and action 2, the voice path may pass through MGW 140 as previously described, in which case both the request for MSD sent at stage 301 and the MSD sent at stage 302 are transferred in-band via the MGW 140.

When MSD is transferred from a UE to a PSAP by in-band means over a voice path between the UE and the PSAP (e.g. as at stage 209 in FIG. 2 and as at stage 302 in FIG. 3), the MSD is converted into audio signals (also referred to as audio tones) using a data modem in the UE. As an example, a UE could use a data modem (also referred to as an in-band modem, an in-band data modem, an eCall data modem or an eCall in-band modem) as defined by 3GPP in 3GPP Technical Specification (TS) 26.267. The audio signals output by the data modem encode the sequence of bits that comprise the MSD and enable sending of the MSD by analog means over the voice path rather than by digital means as a sequence of bits sent over a signaling path. In this case, the audio signals are transferred to the PSAP over the voice path and converted back into the MSD at the PSAP using the same type of data modem as at the UE but used for the reverse transformation. While the MSD is being transferred, speech from a user of the UE (e.g. a driver or passenger of a vehicle) cannot be sent by the UE to the PSAP. In some cases, speech from a PSAP operator also cannot be sent to the user of the UE. This interruption of the voice path may be disconcerting or even disturbing to the user and/or to the PSAP operator and may cause either party to disconnect (or attempt to disconnect) the call if persistent (e.g. if lasting longer than 10 to 15 seconds). For this reason, MSD transfer that occurs in-band needs to occur quickly. For example, 3GPP has mandated that MSD transfer for an eCall shall occur within 4 seconds when transfer is via in-band means. However, as mentioned previously, the use of adaptive de-jitter buffering (DJB) in voice communications employing voice packetization and depacketization, such as for LTE, can make this in-band communication (e.g. phase 9 of FIG. 2 and action 2 of FIG. 3) less reliable and subject to longer delay than in other technologies where in-band transfer is over a CS path. In the case of LTE, this is because LTE employs VoIP transfer of voice communication rather than CS transfer in order to improve bandwidth efficiency which requires use of an adaptive DJB to deliver speech frames to a speech decoder at a constant rather than varying rate. However, there is typically a limit to the amount of voice data that is buffered by an adaptive DJB because buffering too much voice data would lead to a noticeable delay in voice transfer and therefore a delay in one user being able to respond to the other. For this reason, an adaptive DJB is typically allocated a limited buffer size (e.g. corresponding to 20-40 milliseconds (ms) of packetized voice) to remove jitter in communications over a packetized voice channel. Buffer overflow (when incoming packetized voice is arriving too quickly thereby risking packet loss) and buffer underflow (when incoming packetized voice is arriving too slowly thereby risking having no speech frames available to send to a speech decoder) are compensated for by introducing time-warping distortion into the voice channel communications. With time-warping, packetized voice may be compressed when buffer overflow is imminent and may be expanded when buffer underflow is imminent. Although the distortion introduced by time-warping in the case of speech is typically not noticeable to human users, it can interfere with (e.g. corrupt) the data modem audio signals that transfer the MSD over the voice channel (e.g., using pulse position modulation), thereby reducing the reliability of MSD transfer over LTE. References to the use of adaptive DJB herein (e.g. as performed by MGW 140) may include use of time-warping even when not specifically mentioned.

Techniques are provided herein to increase the reliability of data modem signals over an LTE voice channel, for NG eCall and/or other applications. It can be noted that the functionality of the UE 105 is described in the embodiments that follow. However, it will be understood that, because the UE 105 can be incorporated into and/or compose part of the IVS 107, the UE 105 and IVS 107 are virtually interchangeable in the descriptions below.

According to some embodiments, a call from a UE 105 may be received by an MGCF 135, which identifies the call as an NG eCall. The MGCF 135 can then relay this information to the MGW 140, instructing the MGW 140 to disable adaptive DJB and instead employ a deeper, static DJB, thereby making the in-band transferred MSD less likely to be corrupted by packet-dropping and/or the need for time warp distortion. To further ensure the integrity of voice signals from the data modem, the MGCF 135 can also negotiate with the UE 105 (e.g. as part of phase 5, phase 7 and phase 8 in FIG. 2) a higher bit rate codec and/or a codec type that is known to support MSD transfer better than others and can reduce the impacts of signal compression.

Negotiation of codec type and bit rate can occur between the UE 105 and MGCF 135 using the Session Description Protocol (SDP) which may be carried in SIP messages (or other messages) as part of the establishment of an NG eCall—e.g. such as the SIP INVITE for phase 5 and for action 7a and the SIP STATUS for action 7e in FIG. 2. According to some embodiments, the MGCF 135 is notified of the codec types and bit rates that the UE 105 supports in an SDP body carried in the initial SIP INVITE sent by the UE 105 to establish an NG eCall (e.g. as at action 7a in FIG. 2) and can then select a codec type and bit rate supported by the UE 105 that will minimize degradation and corruption of in-band MSD transfer. The MGCF 135 may be in a unique position to do this because (a) the MGCF 135 can be aware that an NG eCall is being established via an eCall indication in the initial SIP INVITE (e.g. the SIP INVITE for action 7a in FIG. 2) and (b) the MGCF 135 can be aware that the eCall will reach the legacy PSAP 150 via circuit means due to being the signaling interworking point between the IMS/PS domain (on the network side) and the CS domain (on the legacy PSAP 150 side). In addition, because the UE 105 knows an NG eCall is being established, the UE 105 may additionally or alternatively include only codec types and bit rates in the initial SIP INVITE (e.g. sent at phase 5 in FIG. 2) that are favorable to reduce degradation and corruption of in-band transfer. The MGCF 135 may convey the chosen codec, bit rate and optionally an eCall indication to the MGW 140. When the UE 105 later sends the MSD in-band towards the PSAP 150, the MGW 140 can transfer the MSD information to the legacy PSAP 150, e.g., by depacketizing, decoding, and re-encoding the VoIP communication received from the UE to PCM A-law. The process of depacketizing, decoding and re-encoding by the MGW 140, also referred to as transcoding, can be performed to reduce or minimize corruption to the MSD (still encoded as audio signals when passing through the MGW 140) as already mentioned. The converted MSD (e.g. in the form of audio signals encoded using PCM A-law) may be transferred through one or more intermediate switches to the legacy PSAP 150 where the MSD may be decoded using a data modem.

The in-band transfer of the MSD may occur as follows at a more detailed level. The UE 105 may first convert the MSD into audio (analog) signals using an eCall data modem (action U1), then encode the resulting audio signals into a digital (bit) stream using a codec negotiated between the UE 105 and MGCF 135 (action U2), then packetize the resulting digital stream into VoIP packets (e.g. using the Real Time Protocol (RTP)) (action U3) and finally send the VoIP packets towards the MGW 140 (action U4) using the IP based voice path established for the eCall (e.g. as at phase 8 in FIG. 2). The MGW 140 may perform some reverse operations comprising depacketizing the received VoIP packets into a digital stream (action M1), decoding the digital stream using the negotiated codec into information representing audio signals (action M2) and re-encoding the information representing audio signals into a circuit switched digital bit stream using a different codec—e.g. for PCM A-law (action M3). The transformed (transcoded) digital stream may then be sent to the PSAP 150 (action M4). At the PSAP 150, the circuit switched digital bit stream may be converted back into audio signals (action P1) from which the MSD may be extracted using the eCall data modem (action P2). The MGW 140 may use knowledge of an eCall supplied by MGCF 135 to modify action M1 and/or action M2 to reduce degradation and corruption of the encoded MSD and facilitate more reliable MSD recovery by PSAP 150 at action P2. Actions M1, M2 and M3 may be referred to as transcoding.

According to some embodiments, once the MSD transfer is complete, the adaptive DJB can again be utilized by the MGW 140, to help facilitate any ensuing voice conversation conducted over the LTE voice channel during the eCall. In some embodiments, the UE 105 may receive a High-Level Acknowledgement (HL-ACK) message from the legacy PSAP 150, indicating the MSD transmission is complete and a voice conversation can start. This can cause the system to revert to using the adaptive DJB. Such functionality may be implemented in various ways.

In some embodiments, the MGW 140 can monitor and interpret the voice channel between the UE 105 and PSAP 150 in order to detect and recognize in-band messages sent from the legacy PSAP 150 to the UE 105. In such embodiments, the MGW 140 can be configured to understand (e.g., fully or partially decode) data modem messages and protocol. When the MGW 140 detects an in-band message from the PSAP 150, it can enable or disable adaptive DJB on the uplink portion of the voice channel (UE 105 to PSAP 150 direction) as appropriate to the detected in-band message. For example, if the MGW 140 detects a request for MSD (e.g. as sent at action 1 in FIG. 3), it can disable adaptive DJB on the uplink in expectation of MSD being sent in the uplink (e.g. as at action 2 in FIG. 3). Similarly, when the MGW 140 detects an HL-ACK, it can enable adaptive DJB on the uplink based on assuming that MSD was successfully sent in the uplink (e.g. as at phase 9 in FIG. 2) and that the uplink will now be used to send normal speech.

In some other embodiments, the MGW 140 can monitor communication for in-band messages from the legacy PSAP 150 and/or from the UE 105 without interpretation. In such embodiments, the MGW 140 may not need to understand in-band messages (e.g., may not need to be familiar with the protocol used), but instead, can merely detect their presence (e.g., via signal analysis to determine whether one or more characteristics of in-band signaling is/are present). Whenever the MGW 140 does not detect in-band messages for some time, it can re-enable adaptive DJB in the uplink UE 105 to PSAP 150 direction. In some embodiments, the MGW 140 may be able to later disable adaptive DJB to allow the MGW 140 to continue transferring the MSD (e.g. in case the MGW 140 mistakenly re-enables adaptive DJB too early and later detects in-band signaling is still in use). For instance, as soon as the MGW 140 detects in-band messages it may disable adaptive DJB. In some embodiments, after MGW 140 stops detecting in-band messages, MGW 140 may delay re-enabling adaptive DJB for a timeout period of a few seconds (e.g. 5 seconds) in order to ensure that in-band signaling has stopped. If in-band signaling is again detected prior to expiration of the timeout period, MGW 140 may not re-enable adaptive DJB.

In some embodiments, when the UE 105 receives an HL-ACK message from PSAP 150 confirming successful transfer of the MSD from UE 105 to PSAP 150, the UE 105 can send a SIP message (e.g. a SIP INFO message) to the MGCF 135, telling the MGCF 135 to signal to the MGW 140 that it can re-enable adaptive DJB.

In some embodiments, when the UE 105 receives a request for MSD from PSAP 150 (e.g. as at action 1 in FIG. 3), the UE 105 can send a SIP message (e.g. a SIP INFO message) to the MGCF 135, telling the MGCF 135 to signal to the MGW 140 that it should disable adaptive DJB. UE 105 may then send MSD in-band to PSAP 150—e.g. possibly after a short delay of 1 or 2 seconds to enable MGW 140 to first disable adaptive DJB.

Some embodiments may further employ an MGW 140 that detects an uplink START message from the legacy PSAP 150 that may be sent in-band to UE 105 to request transfer of updated MSD (e.g. as at action 1 in FIG. 3). After detecting a START message, MGW 140 may disable adaptive DJB on its uplink (for the UE 105 to PSAP 150 direction of transfer). In such an embodiment, when the MGW 140 detects a START message from PSAP 150, MGW 140 may tell the MGCF 135 to signal this to the UE 105 via SIP signaling (e.g. by sending a SIP INFO message). When the UE 105 receives this signal, it may disable adaptive DJB on its downlink (for the PSAP 150 to UE 105 direction of transfer). Such functionality may enable the legacy PSAP 150 to request the UE 105 to re-send the MSD (e.g., when a better position fix for UE 105 is available). The UE 105 may also detect the START message from PSAP 150 and disable adaptive DJB on its downlink.

Figure 4:
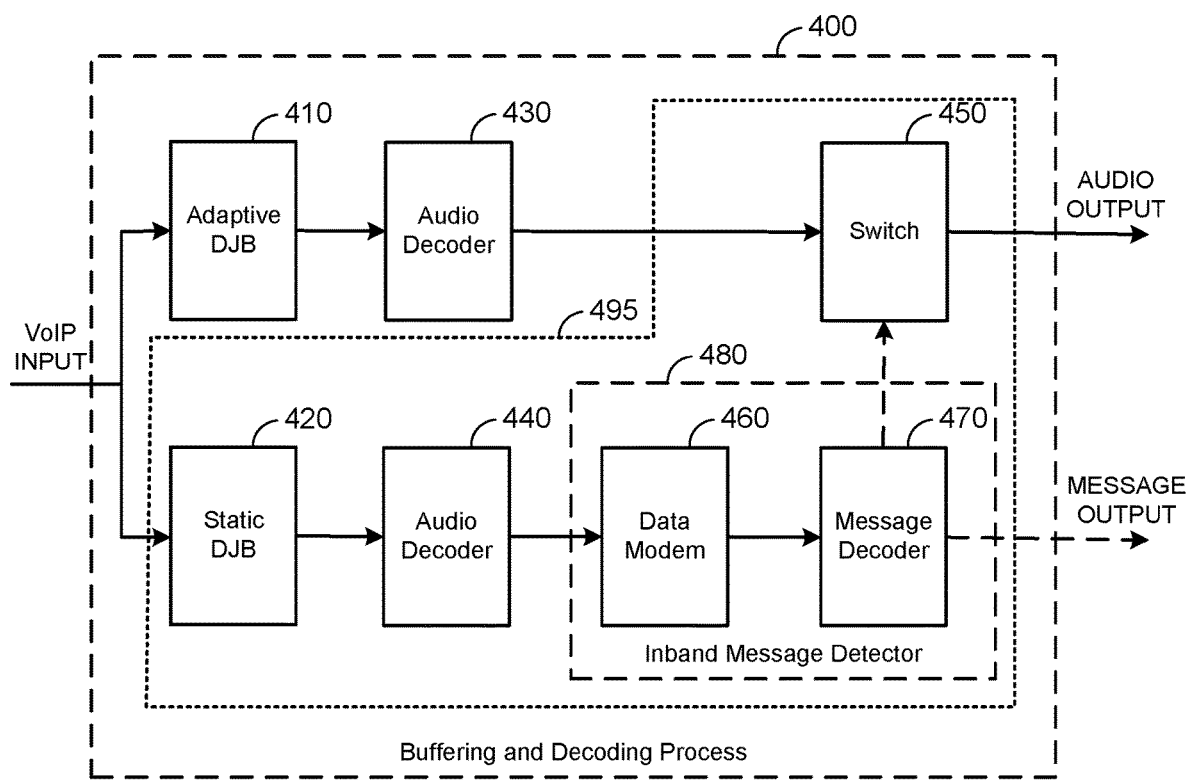
FIG. 4 is a simplified block diagram illustrating a buffering and decoding process, according to one embodiment.

FIG. 4 is a simplified block diagram illustrating a buffering and decoding process 400 that can be performed by the UE 105 to help the UE 105 reliably detect and decode an uplink in-band message (e.g. a START message) that was sent to UE 105 by PSAP 150 using a data modem. The buffering and decoding process 400 may be implemented in hardware and/or software on the UE 105, and may be incorporated into one or more larger components of the UE 105, such as a modem or other communication interface, a processor, and the like.

As illustrated in FIG. 4, the buffering and decoding process 400 can receive a VoIP input in a downlink direction (e.g., VoIP communication from the legacy PSAP 150 over an LTE voice channel). The input is then provided to two DJBs. A first DJB can comprise an adaptive DJB 410 which is delivering encoded audio frames (e.g. speech frames) to the audio decoder 430. The output of the audio decoder 430 may comprise an audio stream (e.g. speech) which is provided to a switch 450. In a normal mode of operation, the switch 450 may transparently pass through the audio stream from the audio decoder 430 as the output of the buffering and decoding process 400 which may be provided to a user of UE 105 (e.g. via a playback device such as a speaker or earphone, not shown in FIG. 4). The adaptive DJB 410 may buffer received VoIP (e.g. RTP) packets for a limited time (e.g. 20-40 ms) before outputting encoded audio frames in order to limit end to end audio delay and avoid the user of UE 105 and operator at PSAP 150 from experiencing a noticeable delay in voice replies from the other party. This may introduce time warping and audio (e.g. speech) clipping as previously described. A second DJB can comprise a static DJB 420 whose output is being fed into an audio decoder 440 which may be similar to or the same as the audio decoder 430. The static DJB 420 may buffer received VoIP (e.g. RTP) packets for longer than adaptive DJB 410 (e.g. 100 ms to 200 ms) in order to avoid loss of audio frames and time warping. The audio stream output from the audio decoder 440 may be passed to a data modem 460 which may detect any message content sent in-band. The output of the data modem 460 may be passed to a message decoder 470 which may determine whether an in-band message is present and the content of the in-band message. In some implementations, the data modem 460 and message decoder 470 may be combined. The data modem 460 combined with the message decoder 470 may be referred to as an In-band message detector 480.

In normal operation, the audio output of the buffering and decoding process 400 may be provided from the output of the adaptive DJB 410 and the audio decoder 430, which may pass transparently through the switch 450 as previously described. However, when the in-band message detector 480 (e.g. the message decoder 470) detects an in-band signal (e.g. a START message), it can signal the switch 450 to cease transferring the audio output from the audio decoder 430 to the user. This may avoid the user hearing the data modem tones used to transfer any message sent via the data modem (e.g. a START message) and thereby avoid disturbing the user. In addition, the in-band message detector 480 (e.g. the message decoder 470) may decode the in-band message that was detected and provide an indication of the message (e.g. the message identity and any message content) to one or more other elements in the UE 105 such as an application processor or process that is supporting eCall transfer of MSD in UE 105. Because encoded audio frames from the static DJB 420 rather than adaptive DJB 410 are passed into the audio decoder 440, there can be less or no time-warping distortion of the data modem signal, allowing the in-band message detector 480 to more reliably detect and decode any in-band message. When the in-band message detector 480 (e.g. the message decoder 470) no longer detects an in-band signal, or possibly following some timeout period (e.g. 1 or 2 seconds) during which no in-band signal is detected by in-band message detector 480, in-band message detector 480 may signal the switch 450 to resume passing through the audio stream from audio decoder 430 to the user of UE 105 (e.g. to a playback device not shown in FIG. 4).

The static DJB 420, audio decoder 440, in-band message detector 480 and switch 450 may be part of a subsystem 495 (shown by the dashed box in FIG. 4). When in-band signaling is not known to be present by UE 105 for a voice path established by UE 105 over LTE network 102 to some other party (e.g. when UE 105 establishes a voice path that is not for an eCall), the buffering and decoding process 400 for the voice path may make use of just the adaptive DJB 410 and the audio decoder 430 but may not make use of (e.g. may exclude) the elements comprising the subsystem 495. For example, the VoIP input may only pass through the adaptive DJB 410 and audio decoder 430 (and not the static DJB 420 and audio decoder 440) and the output of the audio decoder 430 may be sent to a playback device. However, when UE 105 determines that in-band signaling is present or may be present (e.g. as a consequence of establishing a voice path for an eCall to PSAP 150 as described in association with FIG. 2), UE 105 may modify the buffering and decoding process 400 for the voice path by including the elements of subsystem 495 as part of the buffering and decoding process 400 as described previously.

Figure 5:
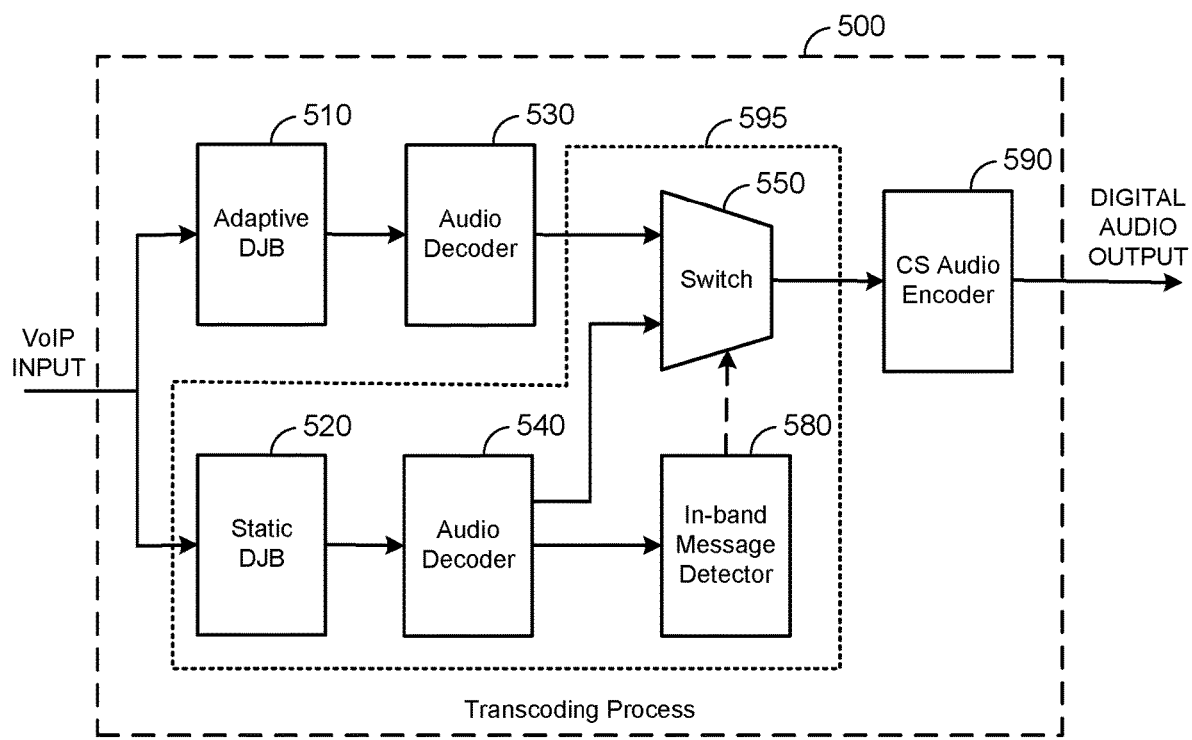
FIG. 5 is a simplified block diagram illustrating a transcoding process, according to one embodiment.

FIG. 5 is a simplified block diagram illustrating transcoding in MGW 140 using a transcoding process 500. Transcoding process 500 may enable MGW 140 to convert an uplink audio stream received from UE 105 in the form of VoIP (e.g. RTP) packets into a circuit switched digital audio stream (e.g. encoded according to PCM A-law) suitable for onward transfer to a legacy PSAP 150. Transcoding process 500 may be similar to buffering and decoding process 400 in FIG. 4 and may employ certain functionally similar elements. The transcoding process 500 may be implemented in hardware and/or software in the MGW 140, and may be incorporated into one or more larger components of the MGW 140, such as a communication interface, a processor, and the like.

As illustrated in FIG. 5, the transcoding process 500 can receive a VoIP input in an uplink direction (e.g., VoIP communication from the UE 105 that is received by MGW 140 from a PDN Gateway 120.) The input is then provided to two DJBs. A first DJB can comprise an adaptive DJB 510 which is delivering encoded audio frames (e.g. speech frames) to the audio decoder 530. The audio decoder 530 may support a codec previously negotiated and agreed with a UE 105 (e.g. during a call establishment phase 8 as described for FIG. 2). The output of the audio decoder 530 may comprise an audio stream (e.g. speech), or information representative of an audio stream (e.g. PCM encoded audio), which is provided to a switch 550. In a normal mode of operation, the switch 550 may transparently pass through the audio stream from the audio decoder 530 to a CS audio encoder 590 which may re-encode the audio stream (or information representative of an audio stream) into a digital stream (e.g. PCM A-law) suitable for transfer to a legacy PSAP 150 by CS means (e.g. over a PSTN). The adaptive DJB 510 may buffer received VoIP (e.g. RTP) packets for a limited time (e.g. 20-40 ms) before outputting encoded audio frames in order to limit end to end audio delay. This may introduce time warping and audio (e.g. speech) clipping into the audio stream.

A second DJB for the transcoding process 500 in FIG. 5 can comprise a static DJB 520 whose output is being fed into an audio decoder 540 which may be similar to or the same as the audio decoder 530. The static DJB 520 may buffer received VoIP (e.g. RTP) packets for longer than adaptive DJB 510 (e.g. 100 ms to 200 ms) in order to avoid loss of audio frames and time warping. The audio stream output from the audio decoder 540 may be passed to an in-band message detector 580 which may be functionally similar to or the same as the in-band message detector 480 described in association with FIG. 4. However, in some implementations, because in-band message detector 580 may not need to decode and interpret in-band messages (unlike in-band message detector 480), in-band message detector 580 may be simpler than in-band message detector 480 (e.g. may not include a data modem element functionally similar to or the same as data modem 460). The output of the audio decoder 540 may also be passed to the switch 550. However, in the normal mode of operation, the switch 550 may transparently pass through the audio output of the audio decoder 530 to the CS audio encoder 590, as previously described, and may block the transfer of the audio output from the audio decoder 540. However, when the in-band message detector 580 detects an in-band signal (e.g. an-band signal used as part of MSD transfer from UE 105 to PSAP 150), the in-band message detector 580 can signal the switch 550 to transition from a normal mode of operation to an in-band signal mode of operation. While in the in-band signal mode of operation, switch 550 may block the transfer of the audio output from the audio decoder 530 and may instead transparently pass the audio output of the audio decoder 540 to the CS audio encoder 590. This may avoid time warping and audio clipping in the transferred audio output to CS audio encoder 590 since the audio output transferred in the in-band mode of operation will have gone through the static DJB 520. As a consequence, the digital audio output of the CS digital encoder 590 that is transferred to PSAP 150 may enable PSAP 150 to more reliably detect and decode any in-band message content (e.g. MSD) than if PSAP 590 was receiving digital audio output that had previously passed through the adaptive DJB 510. When the in-band message detector 580 no longer detects an in-band signal, or possibly following some timeout period (e.g. 1 or 2 seconds) during which no in-band signal is detected by in-band message detector 580, in-band message detector 580 may signal the switch 550 to resume the normal mode of operation in which the audio stream from audio decoder 530 rather than audio decoder 540 is transferred transparently to the CS audio encoder 590. The normal mode of operation may reduce end-to-end audio delay which may avoid the user of UE 105 and an operator of PSAP 150 from noticing any significant delay in receiving replies (e.g. speech replies) from the other party.

In some implementations of the transcoding process 500, the switch 550 may be configured to begin using the in-band signal mode of operation (in which audio output from the static DJB 520 and audio decoder 540 rather than dynamic DJB 510 and audio decoder 530 is passed through the switch 550 to the CS audio encoder 590) as soon as the audio channel is established and transcoding process 500 begins to be used. This may occur at MGW 140 based on MGW 140 being aware that UE 105 will typically transfer in-band signals (e.g. containing MSD) to the PSAP 150 destination when or soon after the audio channel between UE 105 and PSAP 150 is established (e.g. as at phase 8 in FIG. 2). As an example, MGW 140 may be aware of the imminent in-band signaling from UE 105 to PSAP 150 due to receiving an indication of an eCall or an indication of in-band signal transfer on the audio channel from MGCF 135 (e.g. which may occur during call establishment and as part of phase 8 in the example of FIG. 2).

The static DJB 520, audio decoder 540, in-band message detector 580 and switch 550 may be part of a subsystem 595 (shown by the dashed box in FIG. 5). When in-band signaling is not known to be present by MGW 140 in an audio channel for which MGW 140 is performing transcoding from VoIP input to CS output, the transcoding process 500 for the audio channel may make use of just the adaptive DJB 510, the audio decoder 530 and the CS audio encoder 590 but may not make use of (e.g. may exclude) the elements comprising the subsystem 595. For example, the VoIP input to the transcoding process may only pass through the adaptive DJB 510 and audio decoder 530 (and not the static DJB 520 and audio decoder 540) and the output of the audio decoder 530 may always be sent to the CS audio encoder 590. However, when MGW 140 determines that in-band signaling is present or may be present in the audio channel (e.g. as a consequence of receiving an indication from MGCF 135 that a voice channel through MGW 140 has been established for an eCall), MGW 140 may modify the transcoding process 500 by including the elements of subsystem 595 as part of the transcoding process 500 as described previously.

Additionally or alternatively, embodiments (e.g. in which only a single adaptive DJB is used and not an additional static DJB) may cause the UE 105 and/or MGW 140, once an eCall is known (e.g. due to receiving an eCall indication from MGCF 135 in the case of MGW 140 or due to establishing an NG eCall to a PSAP 150 where a confirmation of MSD transfer from PSAP 150 is not received in the case of UE 105), to increase their minimum adaptive de-jitter buffering level by a small amount (e.g., by 20-40 ms). This increase may give their in-band signal detector additional time (e.g., one or more additional audio frames) to process and more reliably detect an in-band signal. Although this will introduce an additional delay to any speech conversation, a small additional delay (e.g., 20-40 ms) may be tolerable to a user of UE 105 and an operator of PSAP 150. With this additional buffering, the in-band signal detector can wait to process one or two more voice frames before deciding whether to perform even deeper buffering for static mode operation, or to continue with adaptive de jitter buffering.

As discussed previously, the techniques described herein can be utilized in NG eCall initiation in an LTE system, but embodiments are not so limited. The disclosed techniques may be utilized more generally to increase the reliability of data received via in-band signaling in a broad variety of applications. As an example, the techniques may be employed in systems that employ IP based communication including VoIP communication between two entities (e.g. a client user and a service provider) where one of the entities can only be accessed via circuit switched means (e.g. over a Public Switched Telephone Network (PSTN)) and where data transfer between the two entities needs to employ in-band signaling over the voice (or audio) channel between the two entities.

Figure 6:
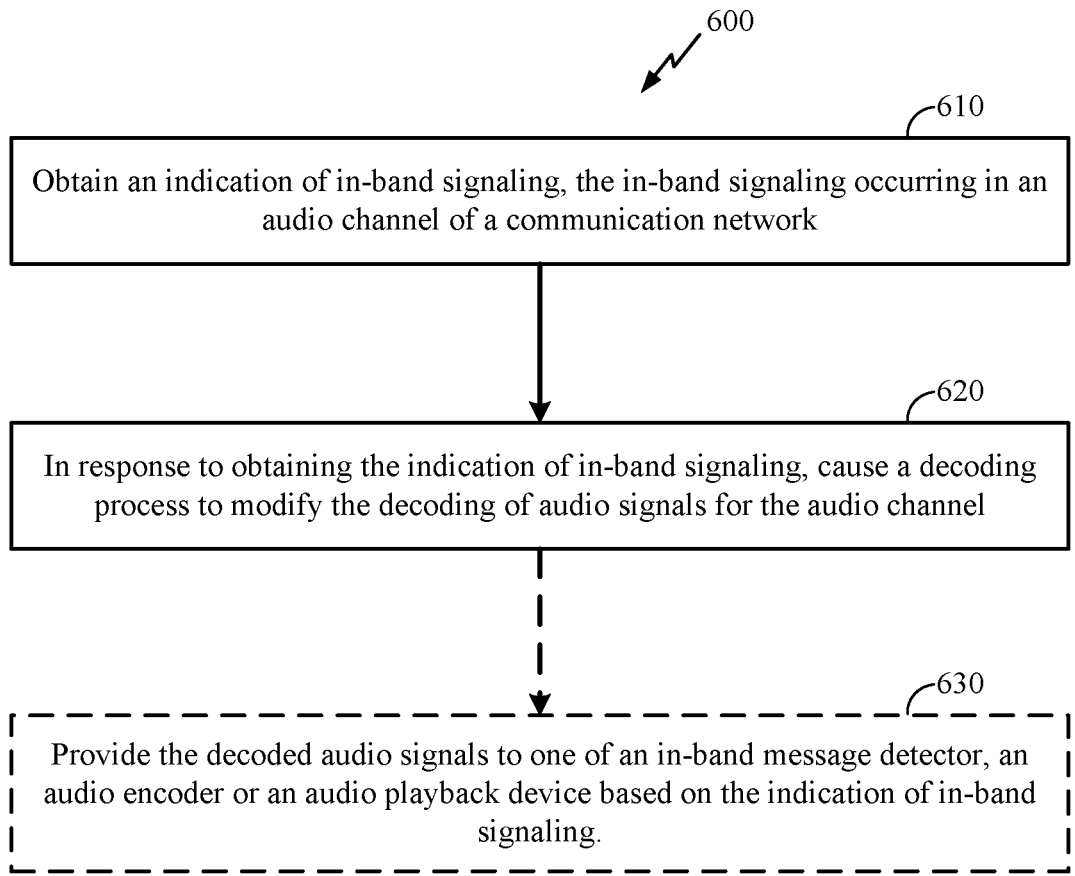
FIG. 6 is a flow diagram illustrating a method of increasing the reliability of the transfer of data received via in-band signaling, according to one embodiment.

FIG. 6 is a flow diagram 600 illustrating a method of increasing the reliability of the transfer of data (e.g. telematics data such as MSD) received via in-band signaling, according to one embodiment. The method may be employed by a UE 105, an MGCF 135 or an MGW 140. As with other figures provided herein, FIG. 6 is provided as a non-limiting example. Alternative embodiments may include additional functionality to that shown in the figure, and/or the functionality shown in one or more of the blocks in the figure may be omitted, combined, separated, and/or performed simultaneously. Means for performing the functionality of the blocks may include one or more hardware and/or software components, such as those described with regard to the computer system of FIG. 9 below. A person of ordinary skill in the art will recognize many variations.

At block 610, an indication of in-band signaling is obtained, where the in-band signaling occurs in an audio channel (e.g. voice channel) of a communication network. As an example, the audio channel may correspond to the audio channel established according to the signaling flow in FIG. 2 between a UE 105 and a legacy PSAP 150.

The functionality at block 620 comprises, in response to obtaining the indication of in-band signaling, causing a decoding process to modify the decoding of audio signals for the audio channel. In some embodiments, the decoding process may correspond to part or all of the buffering and decoding process 400 for UE 105 as described in association with FIG. 4. In other embodiments, the decoding process may correspond to part or all of the transcoding process 500 for MGW 140 as described in association with FIG. 5.

In an optional block 630 which may be employed by a UE 105 or MGW 140, the decoded audio signals, whose decoding was modified in block 620, are provided to one of an in-band message detector (e.g. the in-band message detector 480 in FIG. 4 in the case of a UE 105 or the in-band message detector 580 in FIG. 5 in the case of an MGW 140), an audio encoder (e.g. the CS audio encoder 590 in FIG. 5 in the case of MGW 140) or an audio playback device (e.g. an audio playback device for a UE 105) based on the indication of in-band signaling obtained at block 610.

When the method of flow diagram 600 is performed by a UE 105, the indication of in-band signaling in the audio channel may be obtained at block 610 by the UE 105 based on establishment of an eCall or NG eCall with a legacy PSAP 150 during which transfer of telematics data (e.g. MSD) by out-of-band means from UE 105 to the PSAP 150 is determined by UE 105 not to occur. For example, in the signaling flow described FIG. 2, when the UE 105 does not receive a STATUS message for action 7e at stage 207*e* confirming receipt of MSD transfer, UE 105 may determine that MSD transfer does not occur by out-of-band means. In certain other embodiments, an indication of in-band signaling may be obtained by a UE 105 at block 610 from an MGCF 135—e.g. if legacy PSAP 150 sends a signal using circuit switched signaling (e.g. SS7 ISUP) to MGCF 135 when legacy PSAP 150 starts to send in-band signaling towards UE 105 and if MGCF 135 then forwards the signal to UE 105 using SIP based signaling. In response to obtaining the indication of in-band signaling at block 610, UE 105 may cause a decoding process in the UE 105 to modify the decoding of audio signals for the audio channel received in the downlink direction from legacy PSAP 150 at block 620 by employing a static DJB instead of an adaptive DJB for audio (e.g. voice) depacketization or by increasing the time interval for audio packet buffering in an adaptive DJB. As an example, a UE 105 may use a buffering and decoding process 400 as described for FIG. 4 and may modify the buffering and decoding process 400 in response to obtaining the indication of in-band signaling at block 610 by including the elements comprising the subsystem 495 as described in association with FIG. 4. At block 630, UE 105 may provide the decoded audio signals from block 620 to an in-band message detector and/or to an audio playback device. For example, when UE 105 employs a buffering and decoding process 400 as described in FIG. 4 as a consequence of modifying the decoding of audio signals for the audio channel at block 620, the decoded audio signals from the audio decoder 440 are provided to the in-band message detector 480. In addition, when the in-band message detector 480 does not detect an in-band audio signal, the audio output from the audio decoder 430 may be provided by the buffering and decoding process 400 to a playback device as described for FIG. 4. In certain other embodiments, the indication of in-band signaling may be obtained at a UE 105 at block 610 using a buffering and decoding process 400 as described in association with FIG. 4 in which an in-band message detector 480 detects an in-band signal in the audio channel.

When the method of flow diagram 600 is performed by an MGCF 135, the indication of in-band signaling may be obtained at block 610 by the MGCF 135 based on helping to establish an eCall or an NG eCall between a UE 105 and a legacy PSAP 150 as in the example described in FIG. 2. In this example, the MGCF 135 receives an indication of an NG eCall from IMS 180 (e.g. E-CSCF 130 in IMS 180) in a request to establish an eCall (e.g. as in action 7a in FIG. 2) and forwards the request to establish the eCall to a legacy PSAP 150 via circuit switched means but does not transfer the MSD (e.g. as in action 7b in FIG. 2). The MGCF 135 may transfer the indication of in-band signaling to MGW 140 (e.g. as part of instructions to MGW 140 to support the audio channel between UE 105 and legacy PSAP 150 using a codec and bit rate negotiated by MGCF 135 with UE 105), which may cause MGW 140 to modify a transcoding process which may be used by MGW 140 to support the audio channel established between the UE 105 and PSAP 150. The modification of the transcoding process by MGW 140 may modify the decoding of audio signals for the audio channel at block 620. For example, the MGW 140 may use the transcoding process 500 described in association with FIG. 5 in which buffering and decoding of audio signals is modified by MGW 140 (as a consequence of receiving the indication of in-band signaling from MGCF 135) by including the elements from the subsystem 595 as part of the transcoding process 500. Likewise, in the certain other embodiments, an indication of in-band signaling at block 610 may be obtained by an MGCF 135 from UE 105—e.g. if UE 105 sends a signal in a SIP message (e.g., SIP INFO message) to MGCF 135 when UE 105 is about to start to send in-band signaling (e.g., containing MSD) towards legacy PSAP 150. MGCF 135 may then cause a decoding process in MGW 140 to modify the decoding of audio signals for the audio channel at block 620 as previously described.

When the method of flow diagram 600 is performed by an MGW 140, the indication of in-band signaling may be obtained at block 610 by the MGW 140 from an MGCF 135 when MGCF 135 requests MGW 140 to support the transfer of the audio path between a UE 105 and legacy PSAP 150 as described previously for establishment of an eCall between a UE 105 and legacy PSAP 150. In certain other embodiments, an indication of in-band signaling may be obtained by MGW 140 indirectly from legacy PSAP 150—e.g. if legacy PSAP 150 sends an indication of in-band signaling to MGCF 135 using CS signaling (e.g. SS7 ISUP) when legacy PSAP 150 is about to send in-band signaling to UE 105, with MGCF 135 then forwarding the indication of in-band signaling to MGW 140. In response to obtaining the indication of in-band signaling at block 610, MGW 140 may cause a decoding process in MGW 140 to modify the decoding of audio signals for the audio channel in the uplink direction from UE 105 to legacy PSAP 150 at block 620 by employing a static DJB instead of an adaptive DJB for audio (e.g. voice) depacketization or by increasing the time interval for audio packet buffering in an adaptive DJB. As an example, MGW 140 may use a transcoding process 500 as described for FIG. 5 and may modify the transcoding process 500 in response to obtaining the indication of in-band signaling at block 610 by including the elements comprising the subsystem 595 as described in association with FIG. 5. At block 630, MGW 140 may provide the decoded audio signals from block 620 to an audio encoder—e.g. for onward transfer to legacy PSAP 150 by circuit switched means. For example, when MGW 140 employs a transcoding process 500 as described in FIG. 5 as a consequence of modifying the decoding of audio signals for the audio channel at block 620, the decoded audio signals from the audio decoder 540 are provided to the CS audio encoder 590 via the switch 550. In addition, when the in-band message detector 580 does not detect an in-band audio signal, the audio output from the audio decoder 530 may be provided by the transcoding process 500 to the CS audio encoder 590 as described for FIG. 5. In certain other embodiments, the indication of in-band signaling may be obtained at an MGW 140 at block 610 using a transcoding process 500 as described in association with FIG. 5 in which an in-band message detector 580 detects an in-band signal in the audio channel.

In some embodiments, a message may be sent (e.g., from an MGCF 135) to a device (e.g., a UE 105/IVS 107) generating in-band signaling for an audio channel, wherein the message is indicative of a codec to utilize for the audio channel that is also suitable for conveying the in-band signaling. Additionally or alternatively, the MGCF 135 can cause the bandwidth or bit rate of the audio channel to be increased (e.g., by selecting a relatively high-bandwidth codec to be used for the communication).

Figure 7:
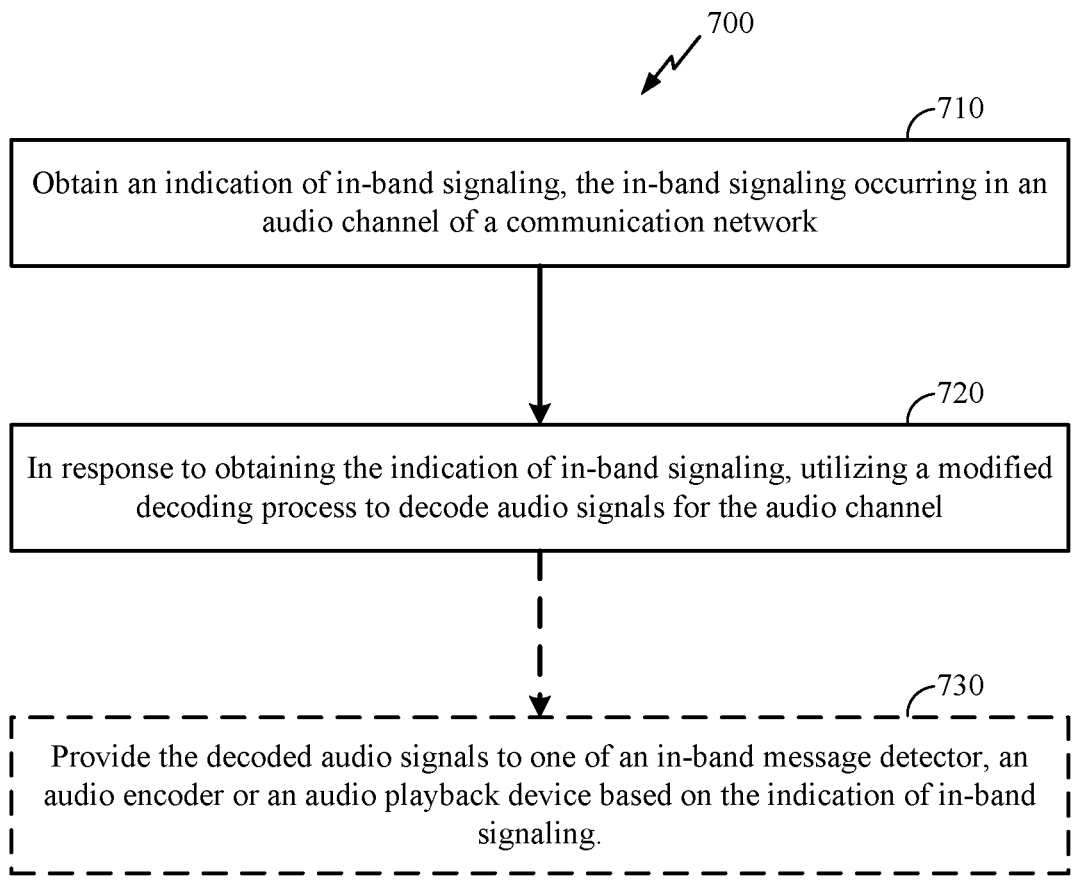
FIG. 7 is a flow diagram illustrating a method of increasing the reliability of the transfer of data received via in-band signaling, according to another embodiment.

FIG. 7 is a flow diagram 700 illustrating a method of increasing the reliability of the transfer of data received via in-band signaling, according to another embodiment. The method is generally similar to the method shown in FIG. 6, with the functionality of blocks 710 and 730 in FIG. 7 repeating the functionality of blocks 610 and 630 (in FIG. 6) respectively. Here, however, the functionality of block 720 includes "utilizing a modified decoding process to decode audio signals for the audio channel," as a consequence of which, the one or more components executing the functionality of block 720 may utilize the modified decoding process. In contrast, for the flow diagram 600, the functionality of block 620 includes "caus[ing] a decoding process to modify the decoding of audio signals for the audio channel", as a consequence of which, the one or more components executing the functionality of block 620 may or may not utilize the modified decoding process. As with FIG. 6, the method of FIG. 7 may be executed by a UE 105, an MGCF 135, and/or an MGW 140.

As with other figures provided herein, FIG. 7 is provided as a non-limiting example. Alternative embodiments may include additional functionality to that shown in the figure, and/or the functionality shown in one or more of the blocks in the figure may be omitted, combined, separated, and/or performed simultaneously. Means for performing the functionality of the blocks may include one or more hardware and/or software components, such as those described with regard to the computer system of FIG. 9 below. A person of ordinary skill in the art will recognize many variations.

Figure 8:
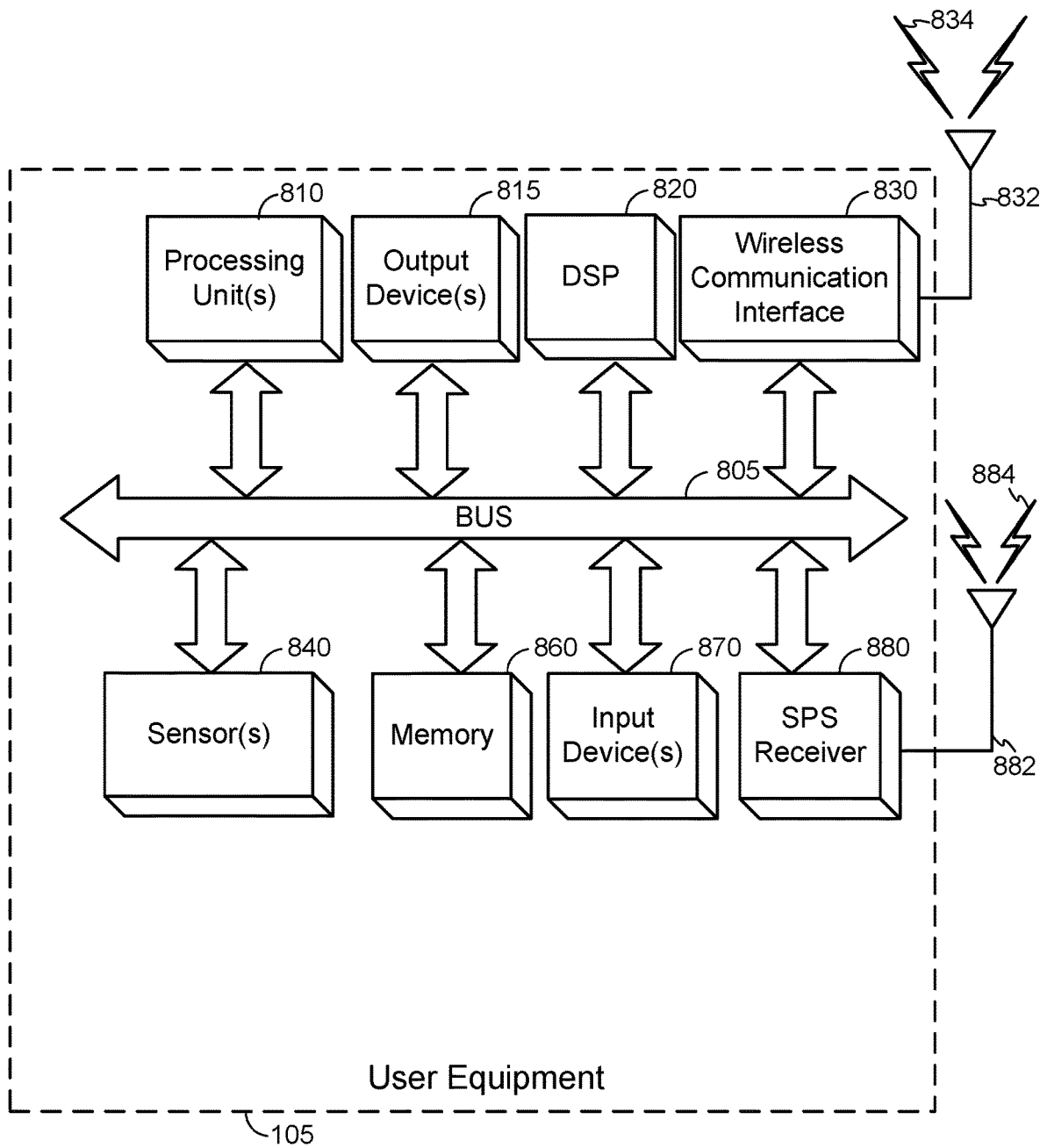
FIG. 8 is a block diagram of an embodiment of a mobile device or UE.

FIG. 8 illustrates an embodiment of a UE 105, which can be utilized as described herein above. For example, the UE 105 can be used in the system 100 for enabling NG eCalls for LTE of FIG. 1. As discussed above, the UE 105 may be further incorporated into an IVS 107, which can include additional features. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations.

The UE 105 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 8, some embodiments may have a separate DSP 820, depending on desired functionality. Buffering logic may be provided in the processing unit(s) 810 and/or wireless communication interface 830 (discussed below). The UE 105 also can include one or more input devices 870, which can include without limitation a touch screen, a touch pad, microphone, button(s), dial(s), switch(es), and/or the like; and one or more output devices 815, which can include without limitation a display, light emitting diode (LED), speakers, and/or the like.

The UE 105 may also include a wireless communication interface 830, which can include without limitation a modem, a network card, an infrared communication device, a wireless communication device, and/or a chipset (such as a Bluetooth device, an IEEE 802.11 device, an IEEE 802.15.4 device, a WiFi device, a WiMax device, cellular communication facilities, etc.), and/or the like. The wireless communication interface 830 may permit data to be exchanged with a network, wireless access points, other computer systems, and/or any other electronic devices described herein. The communication can be carried out via one or more wireless communication antenna(s) 832 that send and/or receive wireless signals 834.

Depending on desired functionality, the wireless communication interface 830 can include separate transceivers to communicate with one or more wireless networks via base stations and/or access points (e.g., eNB 110 of FIG. 1). The one or more wireless networks can include various network types such as a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax network (IEEE 802.16), a Wireless Local Area Network (WLAN), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, a Bluetooth network, an IEEE 802.15x network, or some other type of network. The techniques described herein may also be used for any combination of two or more wireless networks or for wireless networks combined with wireline networks (e.g. the Internet and/or PSTN).

The UE 105 can further include sensor(s) 840. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 840 can be utilized, among other things, to sense an emergency condition that may trigger an eCall or an NG eCall, as described herein.

Embodiments of the UE 105 may also include an SPS receiver 880 capable of receiving signals 884 from one or more SPS satellites using an SPS antenna 882. Such positioning can be utilized to complement and/or incorporate the techniques described herein. The SPS receiver 880 can extract a position of the UE 105, using conventional techniques, from SPS space vehicles (SVs) of an SPS system or GNSS such as the Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the SPS receiver 880 may receive signals from various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS. The SPS receiver 880 may be configured to determine or help determine a location (e.g. latitude and longitude coordinates) for UE 105, based on measuring SPS signals 884, either by itself or in combination with other elements of UE 105 such as processing unit(s) 810. The location may be determined periodically (e.g. at 1 or 2 second intervals) and may be included within telematics data (e.g. MSD) that UE 105 sends to a PSAP (e.g. legacy PSAP 150) when an eCall or NG eCall is instigated by UE 105 as in the example for FIG. 2.

The UE 105 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the UE 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by the UE 105 (and/or a processing unit 810 or DSP 820 within UE 105). In an aspect, then, such code and/or instructions can be used to configure and/or adapt a general purpose computer (or other device) to perform one or more operations in accordance with the described methods.

Figure 9:
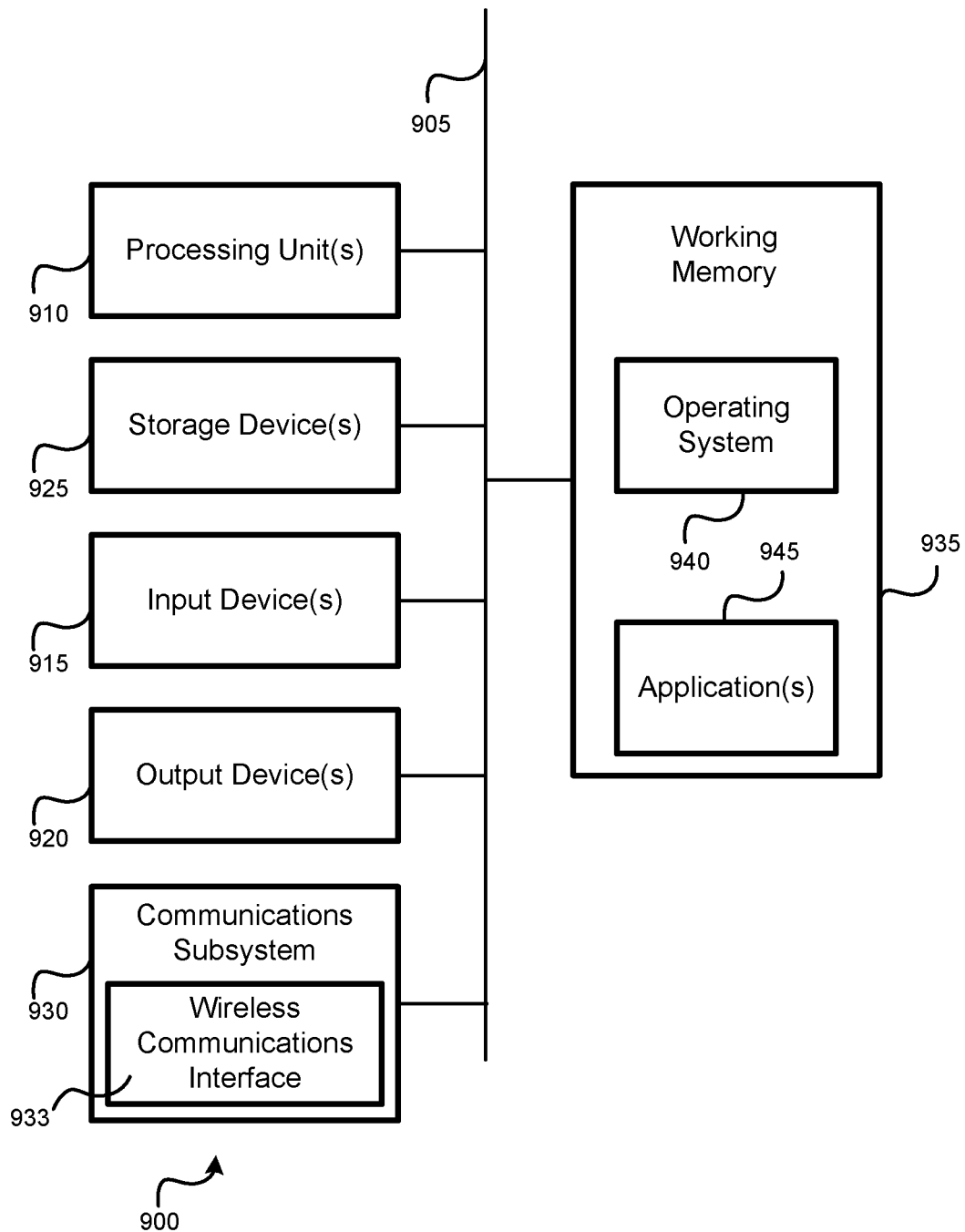
FIG. 9 is a block diagram of an embodiment of a computer system.

FIG. 9 illustrates an embodiment of a computer system 900, which may be incorporated, at least in part, into devices used to implement one or more of the components of the system 100 for enabling NG eCalls for LTE of FIG. 1 and/or components of a similar system configured to implement the techniques disclosed above. FIG. 9 provides a schematic illustration of one embodiment of a computer system 900 that can perform the methods provided by various other embodiments, such as the method described in relation to FIGS. 1 to 7 and/or the functionality of MGCF 135, MGW 140, and/or other components of an LTE system. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical locations.

The computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIGS. 1 to 7. The computer system 900 also can include one or more input devices 915, which can include without limitation a mouse, a keyboard, a camera, a microphone, other biometric sensors, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include wireless communication technologies managed and controlled by a wireless communication interface 933, as well as wired technologies. As such, the communications subsystem can include a modem, a network card (wireless or wired), an infrared communication device, a wireless communication device, and/or a chipset, and/or the like. The communications subsystem 930 may include one or more input and/or output communication interfaces, such as the wireless communication interface 933, to permit data to be exchanged with a network, mobile devices (such as UE 105/IVS 107), other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 900 will further comprise a working memory 935, which can include a RAM and/or or ROM device. Software elements, shown as being located within the working memory 935, can include an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIGS. 1 to 7, may be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method at a communications device of increasing reliability of the transfer of data received via in-band signaling during a 3rd Generation Partnership Project (3GPP) eCall or a next generation eCall, the method comprising:
   obtaining, at an entity configured to decode audio signals on an audio channel of a communication network, an indication that a minimum set of data (MSD) transfer for the eCall or the next generation eCall, in accordance with 3GPP, will not occur out-of-band or an indication of in-band signaling to transfer the minimum set of data (MSD) during the eCall or the next generation eCall in accordance with 3GPP, wherein:

the in-band signaling occurs in the audio channel of the communication network; and in response to obtaining the indication that a minimum set of data (MSD) transfer for the eCall or the next generation eCall will not occur out-of-band or the indication of in-band signaling, causing the entity to utilize a modified decoding process to decode audio signals for the audio channel, wherein the modified decoding process comprises:

disabling an adaptive de-jitter buffer, or increasing a time interval for audio packet buffering in the adaptive de-jitter buffer.

2. The method of claim 1, wherein the communication network comprises a Long Term Evolution network.

3. The method of claim 1, wherein the indication of in-band signaling is obtained from a message received from a remote device.

4. The method of claim 1, wherein the indication of in-band signaling is obtained via a detector analyzing signals transmitted on the audio channel.

5. The method of claim 1, wherein the modified decoding process further comprises disabling the adaptive de-litter buffer and using a static de-jitter buffer.

6. The method of claim 1, further comprising providing the decoded audio signals to at least one of an in-band message detector, an audio encoder, or an audio playback device based on the indication of in-band signaling.

7. The method of claim 6, wherein the communications device is a user equipment and the data is the MSD for the next generation eCall.

8. The method of claim 6, wherein the communications device is a Media Gateway, the data is the MSD for the next generation eCall and the modified decoding process comprises a transcoding process.

9. The method of claim 1, further comprising, in response to obtaining the indication of in-band signaling, sending a message to a device generating the in-band signaling, wherein the message is indicative of a codec to utilize for communicating the in-band signaling.

10. The method of claim 1, further comprising, in response to obtaining the indication of in-band signaling, causing a bandwidth of the audio channel to be increased.

11. A device for increasing reliability of the transfer of data received via in-band signaling during a 3rd Generation Partnership Project (3GPP) eCall or a next generation eCall, the device comprising:

a communications subsystem; and a processing unit communicatively coupled to the communications subsystem and configured to cause the device to:

decode audio signals on an audio channel of a communication network;

obtain an indication that a minimum set of data (MSD) transfer for the eCall or the next generation eCall, in accordance with 3GPP, will not occur out-of-band or an indication of in-band signaling to transfer the minimum set of data (MSD) during the eCall or the next generation eCall in accordance with 3GPP, wherein:

the in-band signaling occurs in the audio channel of the communication network; and in response to obtaining the indication that a minimum set of data (MSD) transfer for the eCall or the next generation eCall will not occur out-of-band or the indication of in-band signaling, utilize a modified decoding process to decode audio signals for the audio channel, wherein the modified decoding process comprises:

disabling an adaptive de-jitter buffer, or increasing a time interval for audio packet buffering in the adaptive de-jitter buffer.

12. The device of claim 11, wherein the communications subsystem is configured to obtain the indication of in-band signaling from a message received from a remote device.

13. The device of claim 11, further comprising a detector configured to analyze signals transmitted on the audio channel to obtain the indication of in-band signaling.

14. The device of claim 11, wherein the processing unit is configured to cause the device to disable the adaptive de-litter buffer and use a static de-jitter buffer as part of the modified decoding process.

15. The device of claim 11, wherein the processing unit is configured to cause the device to provide the decoded audio signals to at least one of an in-band message detector, an audio encoder, or an audio playback device based on the indication of in-band signaling.

16. The device of claim 11, wherein the processing unit is configured to cause the device to, in response to obtaining the indication of in-band signaling, send a message, via the communications subsystem, to a device generating the in-band signaling, wherein the message is indicative of a codec to utilize for communicating the in-band signaling.

17. The device of claim 11, wherein the processing unit is configured to cause the device to, in response to obtaining the indication of in-band signaling, cause a bandwidth of the audio channel to be increased.

18. An apparatus for increasing reliability of the transfer of data received via in-band signaling during a 3rd Generation Partnership Project (3GPP) eCall or a next generation eCall, the apparatus comprising:

means for obtaining, at an entity configured to decode audio signals on an audio channel of a communication network, an indication that a minimum set of data (MSD) transfer for the eCall or the next generation eCall, in accordance with 3GPP, will not occur out-of-band or an indication of in-band signaling to transfer the minimum set of data (MSD) during the eCall or the next generation eCall in accordance with 3GPP, wherein:

the in-band signaling occurs in the audio channel of the communication network; and means for, in response to obtaining the indication that a minimum set of data (MSD) transfer for the eCall or the next generation eCall will not occur out-of-band or the indication of in-band signaling, causing the entity to utilize a modified decoding process to decode audio signals for the audio channel, where in the modified decoding process comprises:

disabling an adaptive de-jitter buffer, or increasing a time interval for audio packet buffering in the adaptive de-jitter buffer.

19. The apparatus of claim 18, wherein the means for causing the entity to utilize the modified decoding process comprises means for disabling the adaptive de-litter buffer and further comprises means for using a static de-jitter buffer.

20. The apparatus of claim 18, further comprising means for providing the decoded audio signals to at least one of an in-band message detector, an audio encoder, or an audio playback device based on the indication of in-band signaling.

21. The apparatus of claim 18, further comprising means for, in response to obtaining the indication of in-band signaling, sending a message to a device generating the in-band signaling, wherein the message is indicative of a codec to utilize for communicating the in-band signaling.

22. The apparatus of claim 18, further comprising means for, in response to obtaining the indication of in-band signaling, causing a bandwidth of the audio channel to be increased.

23. A non-transitory computer readable medium having instructions embedded thereon for increasing reliability of the transfer of data received via in-band signaling during a 3rd Generation Partnership Project (3GPP) eCall or a next generation eCall, the instructions including computer code for:
- decoding audio signals on an audio channel of a communication network;
- obtaining an indication that a minimum set of data (MSD) transfer for the eCall or the next generation eCall, in accordance with 3GPP, will not occur out-of-band or an indication of in-band signaling to transfer the minimum set of data (MSD) during the eCall or the next generation eCall in accordance with 3GPP, wherein:
  - the in-band signaling occurs in the audio channel of the communication network; and
- in response to obtaining the indication that a minimum set of data (MSD) transfer for the eCall or the next generation eCall will not occur out-of-band or the indication of in-band signaling, utilizing a modified decoding process to decode audio signals for the audio channel, wherein the modified decoding process comprises:
  - disabling an adaptive de-litter buffer, or
  - increasing a time interval for audio packet buffering in the adaptive de-litter buffer.

24. The non-transitory computer readable medium of claim 23, wherein the computer code for utilizing the modified decoding process comprises computer code for disabling the adaptive de-jitter buffer and further comprises computer code for using a static de jitter buffer.

25. The method of claim 1, wherein disabling the adaptive de jitter buffer comprises bypassing the adaptive de-jitter buffer to decode the MSD.

26. The device of claim 11, wherein disabling the adaptive de-jitter buffer comprises bypassing the adaptive de-jitter buffer to decode the MSD.

27. The apparatus of claim 18, wherein disabling the adaptive de-jitter buffer comprises bypassing the adaptive de-jitter buffer to decode the MSD.

28. The non-transitory computer readable medium of claim 23, wherein disabling the adaptive de-jitter buffer comprises bypassing the adaptive de jitter buffer to decode the MSD.

* * * * *